(12) United States Patent
Liu et al.

(10) Patent No.: US 10,235,624 B2
(45) Date of Patent: Mar. 19, 2019

(54) INFORMATION PROCESSING METHOD AND APPARATUS

(71) Applicant: TENCENT TECHNOLOGY (SHENZHEN) COMPANY LIMITED, Shenzhen, Guangdong (CN)

(72) Inventors: Kang Liu, Shenzhen (CN); Huaijun Liu, Shenzhen (CN); Yanxiong Lu, Shenzhen (CN); Juhong Wang, Shenzhen (CN); Tingting Liu, Shenzhen (CN); Liheng Xu, Shenzhen (CN); Jun Zhao, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 15/108,758

(22) PCT Filed: Jun. 11, 2015

(86) PCT No.: PCT/CN2015/081274
§ 371 (c)(1),
(2) Date: Jun. 28, 2016

(87) PCT Pub. No.: WO2015/192734
PCT Pub. Date: Dec. 23, 2015

(65) Prior Publication Data
US 2016/0321541 A1    Nov. 3, 2016

(30) Foreign Application Priority Data

Jun. 18, 2014    (CN) .......................... 2014 1 0271542

(51) Int. Cl.
*G06N 3/08* (2006.01)
*G06F 3/01* (2006.01)
(Continued)

(52) U.S. Cl.
CPC ................. *G06N 3/08* (2013.01); *G06F 3/01* (2013.01); *G06N 3/04* (2013.01); *G06N 3/0454* (2013.01); *G06F 17/27* (2013.01)

(58) Field of Classification Search
None
See application file for complete search history.

(56) References Cited

U.S. PATENT DOCUMENTS 5,991,028 A * 11/1999 Cabib .................. C12Q 1/6816
356/456
2013/0138436 A1    5/2013 Yu et al.
(Continued)

FOREIGN PATENT DOCUMENTS

| CN | 102819730 A | 12/2012 |
| CN | 102968410 A | 3/2013 |

(Continued)

OTHER PUBLICATIONS

Danesh, Saeed. Sentiment Analysis Using Recursive Auto-Associative Memory. University of Western Australia. 2012.*
Glorot et al. Deep Sparse Rectifier Neural Networks. JMLR W&CP 15:315-323, 2011.*

(Continued)

*Primary Examiner* — Robert A Cassity
*Assistant Examiner* — Robert Bejcek, II
(74) *Attorney, Agent, or Firm* — Sughrue Mion, PLLC

(57) ABSTRACT

An information processing method and apparatus, the method including: training a Deep Neural Network (DNN) by using an evaluation object seed, an evaluation term seed and an evaluation relationship seed (101); at a first input layer, connecting vectors corresponding to a candidate evaluation object, a candidate evaluation term and a candidate evaluation relationship to obtain a first input vector (102); at a first hidden layer, compressing the first input vector to obtain a first middle vector, and at a first output layer, decoding the first middle vector to obtain a first output (Continued)

vector (103); and determining a first output vector whose decoding error value is less than a decoding error value threshold, and determining a candidate evaluation object, a candidate evaluation term and a candidate evaluation relationship corresponding to the determined first output vector as first opinion information (104). By use of the technical solution, precision of extracting opinion information from an evaluation text can be enhanced.

9 Claims, 7 Drawing Sheets

(51) Int. Cl.
*G06N 3/04* (2006.01)
*G06F 17/27* (2006.01)

(56) References Cited

U.S. PATENT DOCUMENTS

| | | | |
|---|---|---|---|
| 2013/0138589 A1 | 5/2013 | Yu et al. | |
| 2013/0268262 A1 | 10/2013 | Moilanen et al. | |

FOREIGN PATENT DOCUMENTS

| | | |
|---|---|---|
| CN | 103049792 A | 4/2013 |
| CN | 103345656 A | 10/2013 |
| CN | 104049755 A | 9/2014 |

OTHER PUBLICATIONS

Marivate et al. Investigation into the use of Autoencoder Neural Networks, Principal Component Analysis and Support Vector Regression in estimating missing HIV data. Proceedings of the 17th World Congress The International Federation of Automatic Control Seoul, Korea, Jul. 6-11, 2008.*
Azam et al. Comparison of term frequency and document frequency based feature selection metrics in text categorization. Expert Systems with Applications 39 (2012) 4760-4768.*
Khan et al. A Survey of Recent Trends in One Class Classification. L. Coyle and J. Freyne (Eds.): AICS 2009, LNAI 6206, pp. 188-197, 2010.*
International Search Report and Written Opinion (in English) issued in PCT/CN2015/081274, dated Aug. 28, 2015; ISA/CN.
Chinese Office Action for Application No. 201410271542.2 dated Jul. 29, 2016, and an English concise explanation of relevance thereof.
Extended European Search Report for Application No. 15809476.3 dated Jun. 8, 2017.
Tang, J. et al. "An Investigation of Recursive Auto-associative Memory in Sentiment Detection", ADMA 2011, Part 1, LNAI 7120, 162-174.
Kambayashi, Y. et al. "Outlier Detection Using Replicator Neural Networks", DaWak 2002, LNCS 2454, 170-180.
Ma, Yunlong, et al. "Parallel Auto-encoder for Efficient Outlier Detection", Institute of Information Engineering, Chinese Academy of Sciences, Beijing, China, 2013.
Communication dated Jan. 8, 2019 issued by the European Patent Office in counterpart application No. 15809476.3.

* cited by examiner

INFORMATION PROCESSING METHOD AND APPARATUS

CROSS-REFERENCE TO RELATED APPLICATIONS

This application is a National Stage of International Application No. PCT/CN2015/081274, filed on Jun. 11, 2015. This application claims the benefit and priority of Chinese Application No. 201410271542.2, filed on Jun. 18, 2014. The entire disclosures of each of the above applications are incorporated herein by reference.

FIELD OF THE TECHNOLOGY

The present disclosure relates to opinion mining technologies and to an information processing method and apparatus in deep neural network.

BACKGROUND OF THE DISCLOSURE

With rapid expansion of the Internet, online shopping has become increasingly popular and many online shopping websites provide a product evaluation platform, making it convenient for users to share product use experience and to make comments about products. The comments are of important reference value for both consumers and product providers.

Currently, the related art uses an opinion mining (also known as comment mining) apparatus to analyze an evaluation text (also known as corpus) from the product evaluation platform, to obtain users' opinion information of the products. However, tests have proven that the precision rate of opinion information obtained by the information processing apparatus provided by the related art is not high, which makes wrong opinion information become "noise", and too much "noise" results in that the product providers cannot make accurate judgment on the product market reaction, and also results in that the consumers cannot correctly select required products according to the opinion information.

SUMMARY

Various embodiments of the present invention provide an information processing method and apparatus, which can enhance precision of extracting opinion information from an evaluation text.

The technical solution of the embodiments of the present invention is implemented as follows:

The various embodiments of the present invention provide an information processing method, the method including:

training a Deep Neural Network (DNN) by using an evaluation object seed, an evaluation term seed, and an evaluation relationship seed, the DNN including a first input layer, a first hidden layer, and a first output layer, the number of nodes of the first input layer corresponding to that of the first output layer, and the number of nodes of the first input layer being greater than that of the first hidden layer;

at the first input layer, connecting vectors corresponding to a candidate evaluation object, a candidate evaluation term, and a candidate evaluation relationship to obtain a first input vector, at the first hidden layer, compressing the first input vector to obtain a first middle vector, and at the first output layer, decoding the first middle vector to obtain a first output vector; and determining whether a decoding error value of the first output vector is less than a decoding error value threshold, if yes, determining the candidate evaluation object, the candidate evaluation term, and the candidate evaluation relationship corresponding to the first output vector as first opinion information.

Training a DNN by using an evaluation object seed, an evaluation term seed, and an evaluation relationship seed includes:

at the first input layer, connecting vectors corresponding to the evaluation object seed, the evaluation term seed, and the evaluation relationship seed to obtain a second input vector;

at the first hidden layer, compressing the second input vector to obtain a second middle vector; and updating a parameter set of the DNN until a Euclidean distance between a second output vector and the second input vector is at the minimum, the second output vector being a vector obtained by decoding the second middle vector at the first output layer.

The method further includes:

sorting evaluation objects in the first opinion information according to the following dimensions in descending order. The number of times the evaluation objects in the first opinion information occur in an evaluation text, and the number of times the evaluation objects in the first opinion information are identified as evaluation object positive examples;

selecting M evaluation objects, in descending order, from the evaluation objects sorted in descending order, and determining the selected M evaluation objects as a subset of the evaluation object seed, M being an integer greater than 1; and training the DNN by using the evaluation object seed, the evaluation term seed, and the evaluation relationship seed after updating the parameter set of the DNN.

After training the DNN by using the evaluation object seed, the evaluation term seed, and the evaluation relationship seed after updating the parameter set of the DNN, the method further includes:

at the first input layer of the DNN after updating the parameter set of the DNN, connecting vectors corresponding to the candidate evaluation object, the candidate evaluation term, and the candidate evaluation relationship to obtain a third input vector, at the first hidden layer of the DNN after updating the parameter set of the DNN, compressing the third input vector to obtain a third middle vector, and at the first output layer of the DNN after updating the parameter set of the DNN, decoding the third middle vector to obtain a third output vector; and determining whether a decoding error value of the third output vector is less than a decoding error value threshold, if yes, determining the candidate evaluation object, the candidate evaluation term and the candidate evaluation relationship corresponding to the third output vector as second opinion information.

Before determining whether the decoding error value of the first output vector is less than the decoding error value threshold, the method further includes:

determining the decoding error value threshold according to the following dimensions:

target precision of opinion information extracted from an evaluation text and target quantity of the opinion information extracted from the evaluation text; wherein the decoding error value threshold is negatively correlated with the target precision, and is positively correlated with the target quantity.

At the first input layer of the DNN, before connecting vectors corresponding to the candidate evaluation object, the candidate evaluation term, and the candidate evaluation relationship, the method further includes:

mapping the candidate evaluation object and the candidate evaluation term into corresponding vectors by using the DNN; and at a second hidden layer to an nth hidden layer of the DNN, recursively mapping objects included in a syntactic dependency path of the evaluation relationship into vectors; wherein a Euclidean distance between any two vectors in the vectors obtained through mapping is positively correlated with a semantic or syntactic likelihood ratio test (LRT) index of the any two vectors, n is a positive integer, and n corresponds to the number of the objects included in the syntactic dependency path of the evaluation relationship.

At the first input layer of the DNN, before connecting vectors corresponding to the candidate evaluation object, the candidate evaluation term, and the candidate evaluation relationship, the method further includes:

extracting nouns from an evaluation text;

determining a likelihood ratio test (LRT) index between an initial evaluation object seed and the nouns extracted from the evaluation text; and determining nouns in the extracted nouns as a subset of the evaluation object seed, wherein the LRT index between the determined nouns and the initial evaluation object seed is greater than an LRT index threshold.

Various embodiments of the present invention further provide an information processing apparatus, including:

a training unit, configured to train a DNN by using an evaluation object seed, an evaluation term seed, and an evaluation relationship seed, the DNN including a first input layer, a first hidden layer, and a first output layer, the number of nodes of the first input layer corresponding to that of the first output layer, and the number of nodes of the first input layer being greater than that of the first hidden layer;

a connection unit, configured to, at the first input layer, connect vectors corresponding to a candidate evaluation object, a candidate evaluation term and a candidate evaluation relationship to obtain a first input vector;

a compression unit, configured to, at the first hidden layer, compress the first input vector to obtain a first middle vector;

a decoding unit, configured to, at the first output layer, decode the first middle vector to obtain a first output vector; and a first determination unit, configured to determine whether a decoding error value at the first output vector is less than a decoding error value threshold, if yes, determine the candidate evaluation object, the candidate evaluation term, and the candidate evaluation relationship corresponding to the first output vector as first opinion information.

The connection unit is further configured to, at the first input layer, connect vectors corresponding to the evaluation object seed, the evaluation term seed, and the evaluation relationship seed to obtain a second input vector;

the compression unit is further configured to, at the first hidden layer, compress the second input vector to obtain a second middle vector;

the decoding unit is further configured to, at the first output layer, decode the second middle vector to obtain a second output vector; and the training unit is further configured to update a parameter set of the DNN until a Euclidean distance between the second output vector and the second input vector is minimum.

The apparatus further includes:

a sorting unit, configured to sort evaluation objects in the first opinion information according to the following dimensions in descending order. The number of times the evaluation objects in the first opinion information occur in an evaluation text and the number of times the evaluation objects in the first opinion information are identified as evaluation object positive examples;

an updating unit, configured to select M evaluation objects, in descending order, and, from the evaluation objects sorted in descending order, determine the selected M evaluation objects as a subset of the evaluation object seed, M being an integer greater than 1; and the training unit is further configured to train the DNN by using the evaluation object seed, the evaluation term seed, and the evaluation relationship seed after updating the parameter set of the DNN.

The connection unit is further configured to, at the first input layer of the DNN after updating, connect vectors corresponding to the candidate evaluation object, the candidate evaluation term, and the candidate evaluation relationship to obtain a third input vector;

the compression unit is further configured to, at the first hidden layer of the DNN after updating the parameter set of the DNN, compress the third input vector to obtain a third middle vector;

the decoding unit is further configured to, at the first output layer of the DNN after updating the parameter set of the DNN, decode the third middle vector to obtain a third output vector; and the first determination unit is further configured to determine whether a decoding error value of the third output vector is less than a decoding error value threshold and, if yes, determine the candidate evaluation object, the candidate evaluation term, and the candidate evaluation relationship corresponding to the third output vector as second opinion information.

The first determination unit is further configured to, before determining whether the decoding error value of the first output vector is less than the decoding error value threshold, determine the decoding error value threshold according to the following dimensions:

target precision of opinion information extracted from an evaluation text and target quantity of the opinion information extracted from the evaluation text; wherein the decoding error value threshold is negatively correlated with the target precision, and is positively correlated with the target quantity.

The apparatus further includes:

a first mapping unit, configured to map the candidate evaluation object and the candidate evaluation term into corresponding vectors by using the DNN; and a second mapping unit, configured to, at a second hidden layer to an nth hidden layer of the DNN, recursively map objects included in a syntactic dependency path of the evaluation relationship into vectors; wherein a Euclidean distance between any two vectors in the vectors obtained through mapping is positively correlated with a semantic or syntactic LRT index of the any two vectors, n is a positive integer, and n corresponds to the number of the objects included in the syntactic dependency path of the evaluation relationship.

The apparatus further includes:

an extraction unit, configured to extract nouns from an evaluation text; and a second determination unit, configured to determine an LRT index between an initial evaluation object seed and the nouns extracted from the evaluation text and determine nouns in the extracted nouns as a subset of the evaluation object seed, wherein the LRT index between the determined nouns and the initial evaluation object seed is greater than an LRT index threshold.

In various embodiments of the present disclosure, vectors corresponding to an evaluation object, an evaluation term, and an evaluation relationship are connected at a first input layer of a DNN and are input to a first hidden layer, and as the number of nodes of the first hidden layer is less than that of the first input layer, it is equivalent to compressing semantic or syntactic features represented by each dimension of the input vectors at the first hidden layer. When the vectors are output to a first output layer for computing, as the number of nodes of the first output layer corresponds to that of the first input layer, it is equivalent to decoding and outputting a middle vector after compression at the hidden layer, and during implementation of the present disclosure, the smaller a decoding error value of a vector is, the greater the probability that the evaluation object, the evaluation term, and the evaluation relationship corresponding to the vector are correct opinion information, so that extraction precision of opinion information can be controlled according to the decoding error value, achieving an effect of enhancing precision of extracting opinion information from an evaluation text.

DESCRIPTION OF EMBODIMENTS

Figure 1:
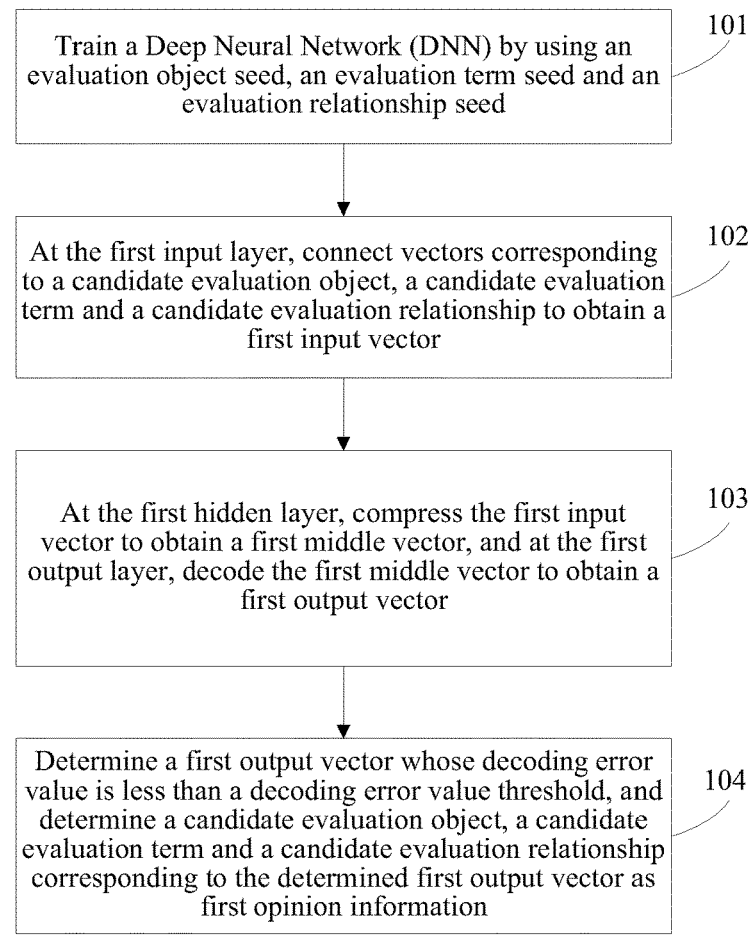
FIG. 1 is a flowchart of implementation of an information processing method according to various embodiments of the present disclosure.

In order to make the objectives, technical solutions and advantages of the present disclosure more comprehensible, the present disclosure is further described below in detail with reference to accompanying drawings and embodiments. It should be understood that specific embodiments described herein are merely used to explain the present disclosure, but not intended to limit the present disclosure.

During implementation of the present disclosure, the inventor finds that, in the related art, opinion information obtained by an information processing apparatus includes evaluation objects (generally functions or attributes of a product), evaluation terms (words expressing user opinion polarity, which can be understood as polarity sentiment words), and evaluation relationships (that is, modification relationships between the evaluation terms and the evaluation objects). The inventor also finds the problem with the precision rate of opinion information output by the information processing apparatus in the related art is not high, as shown in at least the following examples.

Incorrect identification of evaluation terms. That is, words not expressing user opinion polarity are identified as evaluation terms. For example, if an evaluation text in an mp3 field (i.e., the evaluation text is from an evaluation platform of an mp3 product) includes an evaluation text "Just another mp3 I bought", the information processing apparatus, when processing the evaluation text according to a syntactic dependency path, registers that the word closest to an evaluation object in a sentence is an evaluation term, therefore, when "mp3" is used as an evaluation object seed to search for an evaluation term in the evaluation text, for the evaluation text, it is determined that "another" is an evaluation term that modifies the evaluation object "mp3", and as the evaluation term "another" is not a polarity sentiment word (e.g., good, bad), it results in that noise opinion information is output, thereby affecting precision of extracting opinion information.

Similarly, in the related art, when the information processing apparatus uses a co-occurrence statistical manner to determine opinion information, if, in the evaluation text in the mp3 field, a ratio of the number of times "another" and the evaluation object seed "mp3" co-occur in the evaluation text (set as a) to the sum of the number of times "another" occurs alone in the evaluation text (set as b) and the number of times "mp3" occurs alone in the evaluation text (set as c), that is, a/(b+c), exceeds a preset threshold, it is determined that "another" and "mp3" are elements in the opinion information, it is determined according to part of speech that "another" is used for evaluating "mp3", and the corresponding opinion information is "another mp3", which results in that noise opinion information is extracted, thereby affecting precision of extracting opinion information.

Incorrect identification of evaluation objects. That is, a word modified by an evaluation object is identified incorrectly. For example, for an evaluation text "the mp3 has many good things", the information processing apparatus, when processing the evaluation text based on a syntactic dependency path, thinks that the word closest to an evaluation object in a sentence is an evaluation term, that is, an evaluation relationship exists between the word closest to the evaluation object and the evaluation object. Therefore, when "good" is used as an evaluation term seed to look for an evaluation object in the evaluation text in the mp3 field (i.e., the evaluation text is an evaluation text of an mp3 product), for the evaluation text, it is determined that the object modified by "good", i.e., the evaluation object, is "things", however, things is a word irrelevant to the field of mp3 products, which thus generates noise opinion information.

Similarly, in the related art, when the information processing apparatus uses a co-occurrence statistical manner to determine opinion information, when "mp3" is used as an evaluation term seed to look for an evaluation object in the evaluation text of mp3, if a ratio of the number of times "another" and "mp3" co-occur in the evaluation text to the number of times "another" and "mp3" occur separately in the evaluation text exceeds a preset threshold, it is determined that "another" and "mp3" are elements in the opinion information, it is determined according to part of speech that "another" is used for evaluating "mp3", and the corresponding opinion information is "another mp3", which thus generates noise opinion information.

In combination with the analysis, in the related art, during extraction of opinion information, only any two in an evaluation term, an evaluation object, and an evaluation relationship are verified in an evaluation text, thus resulting in the problem of low precision of extraction of opinion information. For example, when an evaluation term is determined according to an evaluation object seed term, it is determined that the evaluation term is used for modifying the evaluation object seed term, but whether a modification relationship between the determined evaluation term and the evaluation object seed term is correct has not been verified. Likewise, when the evaluation object is determined according to an evaluation term seed, it is determined that the evaluation term seed is used for modifying the determined evaluation object, but whether a modification relationship between the evaluation term seed and the determined evaluation object is correct is not verified, resulting in that the information processing apparatus in the related art has a problem that extraction precision of opinion information is not high. Accordingly, the precision of extracting the opinion information can be improved significantly if the evaluation term, the evaluation object, and the evaluation relationship can be verified at the same time when the opinion information is extracted from the evaluation text.

Various embodiments of the present disclosure describe an information processing method, which can verify evaluation terms, evaluation objects, and evaluation relationships included in an evaluation text at the same time and has high precision of extraction of opinion information. As shown in FIG. 1, the information processing method described in the various embodiments include the following blocks.

Block 101: Train a DNN by using an evaluation object seed, an evaluation term seed, and an evaluation relationship seed.

The DNN includes a first input layer, a first hidden layer and a first output layer, the number of nodes of the first input layer correspond to that of the first output layer, and the number of nodes of the first input layer are greater than that of the first hidden layer.

The evaluation object seed, the evaluation term seed, and the evaluation relationship seed can correspond to a different product field (such as MP3 or Phone), and the evaluation object seed, the evaluation term seed, and the evaluation relationship seed constitute correct opinion information (opposite to noise opinion information) of a product in a corresponding field. Therefore, seeds can also be seen as positive examples, and the evaluation object seed, the evaluation term seed, and the evaluation relationship seed constitute opinion information positive examples.

Block 102: At the first input layer, connect vectors corresponding to a candidate evaluation object, a candidate evaluation term, and a candidate evaluation relationship to obtain a first input vector.

The candidate evaluation object, the candidate evaluation term, and the candidate evaluation relationship constitute candidate opinion information, and the various embodiments are aimed at extracting correct opinion information from the candidate opinion information. The candidate evaluation object and the candidate evaluation term can be obtained through extraction from an evaluation text. For example, verbs and adjectives can be extracted from the evaluation text as candidate evaluation terms, and nouns are extracted from the evaluation text as candidate evaluation objects. The candidate evaluation relationship can be determined based on a syntactic dependency path of the evaluation text.

Vectors corresponding to the candidate evaluation object and the candidate evaluation term can be obtained through word vector learning by using the DNN, the word vector learning refers to mapping the candidate evaluation object and the candidate evaluation term to a high-dimensional space to obtain vectors, and each dimension of the vectors represents a syntactic or semantic feature of the term. The various embodiments carry out word vector learning according to the following strategy, i.e., when two words are syntactically or semantically closer, a Euclidean distance between word vectors of the two words is smaller.

The vector corresponding to the candidate evaluation relationship can be obtained by recursively mapping the evaluation relationship according to a syntactic dependency path at a second hidden layer to an nth hidden layer of the DNN. Wherein a Euclidean distance between any two vectors in the vectors obtained through mapping is positively correlated with a semantic or syntactic LRT index of the any two vectors, n is a positive integer, and n corresponds to the number of the objects included in the syntactic dependency path of the evaluation relationship.

Block 103: At the first hidden layer, compress the first input vector to obtain a first middle vector, and at the first output layer, decode the first middle vector to obtain a first output vector.

As the number of nodes (also referred to as computing units) of the first hidden layer are less than that of the first input layer and each node of the first hidden layer only carries an operation of one dimension of a vector, semantic or syntactic features of the vector output by the first input layer to the first hidden layer can be compressed, as the number of nodes of the first output layer are the same as that of the first input layer, the middle vector output by the first hidden layer to the first output layer can be decoded.

Block 104: Determine whether a decoding error value of the first output vector is less than a decoding error value threshold, if yes, determine the candidate evaluation object, the candidate evaluation term, and the candidate evaluation relationship corresponding to the first output vector as first opinion information.

During implementation of the present disclosure, if a vector corresponding to an opinion information positive example (i.e., the vector formed by connecting the vectors corresponding to the evaluation object seed, the evaluation term seed, and the evaluation relationship seed) is input at the first input layer, as the closer semantic or syntactic features between vectors are, the smaller the Euclidean distance between the vectors is, therefore, semantic or syntactic features of the opinion information positive example can be well decoded at the first output layer (that is, a less decoding error value will be obtained). Alternately, if an opinion information negative example (i.e., noise opinion information) is input at the first input layer, a decoding error value of the vector output at the first output layer will be greater than that of the vector corresponding to the opinion information positive example, thus leading to failure of decoding at the output layer. Accordingly, the process of extracting opinion information from an evaluation text can be converted to a process of, at the first input layer, inputting the first input vectors corresponding to the candidate evaluation term, the candidate evaluation object, and the candidate evaluation relationship, and verifying whether a decoding error value of the first output vector at the first output layer is small. For example, the candidate evaluation term, the candidate evaluation object, and the candidate evaluation relationship corresponding to the vector in the first output vectors decoded and output whose decoding error value is less than a decoding error value threshold can be output as opinion information positive examples (i.e., first opinion information).

Before the first input vector corresponding to the candidate evaluation term, the candidate evaluation object, and the candidate evaluation relationship is input at the first input layer, it is necessary to use the evaluation term seed, the evaluation object seed, and the evaluation relationship seed to train the DNN, so that the DNN has good performance of correctly decoding semantic or syntactic features of vectors corresponding to positive examples at the first output layer (i.e., the decoding error value is small).

As one example, the DNN can be trained in the following manner. At the first input layer, connecting vectors corresponding to the evaluation object seed, the evaluation term seed, and the evaluation relationship seed to obtain a second input vector; at the first hidden layer, compressing the second input vector to obtain a second middle vector, and updating a parameter set of the DNN until a Euclidean distance between a second output vector and the second input vector is minimum, the second output vector being a vector obtained by decoding the second middle vector at the first output layer.

In application, evaluation object seeds inevitably have a problem of sparse distribution, thus resulting in that first opinion information extracted from the evaluation text being incomplete. In view of this, evaluation objects in the first opinion information can be sorted according to the following dimensions in descending order. The number of times the evaluation objects in the first opinion information occur in an evaluation text and the number of times the evaluation objects in the first opinion information are identified as evaluation object positive examples, selecting M (M is an integer greater than 1) evaluation objects, in descending order, from the evaluation objects sorted in descending order, and determining the selected M evaluation objects as a subset of the evaluation object seed, equivalent to expanding the evaluation object seeds according to the opinion information (i.e., first opinion information) extracted from the evaluation text for the first time. In this way, re-training the DNN by using the evaluation term seed, the evaluation relationship seed, and the evaluation object seed after updating the parameter set of the DNN can make the DNN have positive performance of correctly decoding semantic or syntactic features of vectors corresponding to positive examples at the first output layer.

Correspondingly, it is feasible to, at the first input layer of the DNN after updating the parameter set of the DNN, connect vectors corresponding to the candidate evaluation object, the candidate evaluation term and the candidate evaluation relationship to obtain a third input vector, at the first hidden layer of the DNN after updating the parameter set of the DNN, compress the third input vector to obtain a third middle vector, and at the first output layer of the DNN after updating the parameter set of the DNN, decode the third middle vector to obtain a third output vector and determine whether a decoding error value of the third output vector is less than a decoding error value threshold. If yes, determine the candidate evaluation object, the candidate evaluation term and the candidate evaluation relationship corresponding to the third output vector as second opinion information. As the second opinion information is obtained based on the re-trained DNN, the second opinion information is more comprehensive relative to the first opinion information, that is, compared with the first opinion information, the second opinion information includes more candidate evaluation term positive examples, candidate evaluation object positive examples, and candidate evaluation relationship positive examples.

In order to further overcome the problem of sparse distribution of the evaluation object seeds, at the first input layer of the DNN, before vectors corresponding to the evaluation object, the evaluation term, and the evaluation relationship are connected to train the DNN, nouns can be extracted from the evaluation text, an LRT index between an initial evaluation object seed and the nouns extracted from the evaluation text is determined, and nouns in the extracted nouns the LRT index between which and the initial evaluation object seed is greater than an LRT index threshold are determined as a subset of the evaluation object seed, equivalent to expanding the evaluation object seed based on the evaluation text, as the expanded evaluation object seed is an evaluation object positive example acquired from the evaluation text, training the DNN by using the expanded evaluation object seed, the evaluation term seed and the evaluation relationship seed can make the DNN have good performance of correctly decoding semantic or syntactic features of vectors corresponding to positive examples at the first output layer.

During actual applications, the decoding error value threshold can be determined according to the following dimensions:

target precision of opinion information extracted from an evaluation text and target quantity of the opinion information extracted from the evaluation text, wherein the decoding error value threshold is negatively correlated with the target precision, and is positively correlated with the target quantity. That is to say, the smaller the decoding error value threshold is, the higher the precision of the first opinion information and the second opinion information is, as the decoding error value threshold becomes less, equivalent to improving requirements for decoding precision, the fewer the first output vectors less than the decoding error value obtained at the first output layer are, and correspondingly, the number of the first opinion information (or the second opinion information) is less; and vice versa.

In various embodiments of the present disclosure, vectors corresponding to an evaluation object, an evaluation term, and an evaluation relationship are connected at a first input layer of a DNN and are input to a first hidden layer, and as the number of nodes of the first hidden layer is less than that of the first input layer, it is equivalent to compressing semantic or syntactic features represented by each dimension of the input vectors at the first hidden layer, when the vectors are output to a first output layer for computing, as the number of nodes of the first output layer corresponds to that of the first input layer, it is equivalent to decoding and outputting a middle vector after compression at the hidden layer, and during implementation of the present disclosure, the inventor finds that the smaller a decoding error value of a vector is, the greater the probability that the evaluation object, the evaluation term, and the evaluation relationship corresponding to the vectors are correct opinion information is, so that extraction precision of opinion information can be controlled according to the decoding error value, achieving an effect of enhancing precision of extracting opinion information from an evaluation text. At the same time, vectors are formed by connecting vectors corresponding to the candidate evaluation object, the candidate evaluation term, and the candidate evaluation relationship, which is equivalent to verifying the evaluation object, the evaluation term, and the evaluation relationship simultaneously by using a decoding error threshold during extraction of opinion information, and precision of the extraction of opinion information is definitely higher than that in the related art.

The various embodiments of the present disclosure further describe a computer storage medium, the computer storage medium stores a computer executable instruction, and the computer executable instruction is used for performing the information processing method shown in FIG. 1.

The various embodiments of the present disclosure further describe an information processing apparatus, as shown in FIG. 2, including:

a training unit 21, configured to train a DNN by using an evaluation object seed, an evaluation term seed, and an evaluation relationship seed, the DNN including a first input layer, a first hidden layer, and a first output layer, the number of nodes of the first input layer corresponding to that of the first output layer, and the number of nodes of the first input layer being greater than that of the first hidden layer;

a connection unit 22, configured to, at the first input layer, connect vectors corresponding to a candidate evaluation object, a candidate evaluation term and a candidate evaluation relationship to obtain a first input vector;

a compression unit 23, configured to, at the first hidden layer, compress the first input vector to obtain a first middle vector;

a decoding unit 24, configured to, at the first output layer, decode the first middle vector to obtain a first output vector; and a first determination unit 25, configured to determine whether a decoding error value of the first output vector is less than a decoding error value threshold, if yes, determine the candidate evaluation object, the candidate evaluation term and the candidate evaluation relationship corresponding to the first output vector as first opinion information.

As one implementation, the connection unit 22 is further configured to, at the first input layer, connect vectors corresponding to the evaluation object seed, the evaluation term seed, and the evaluation relationship seed to obtain a second input vector;

the compression unit 23 is further configured to, at the first hidden layer, compress the second input vector to obtain a second middle vector;

the decoding unit 24 is further configured to, at the first output layer, decode the second middle vector to obtain a second output vector; and the training unit 25 is further configured to update a parameter set of the DNN until a Euclidean distance between the second output vector and the second input vector is minimum.

Figure 2A:
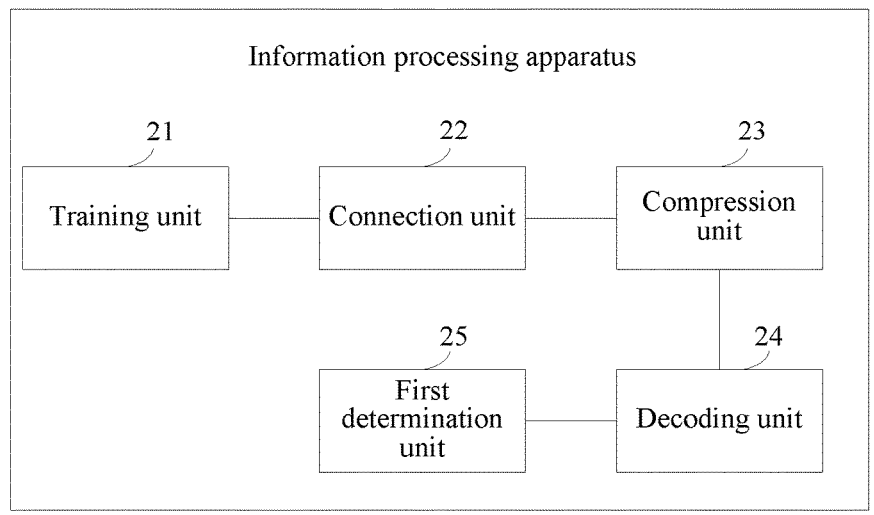
FIG. 2a is a first function structure diagram of an information processing apparatus according to various embodiments of the present disclosure.
Figure 2B:
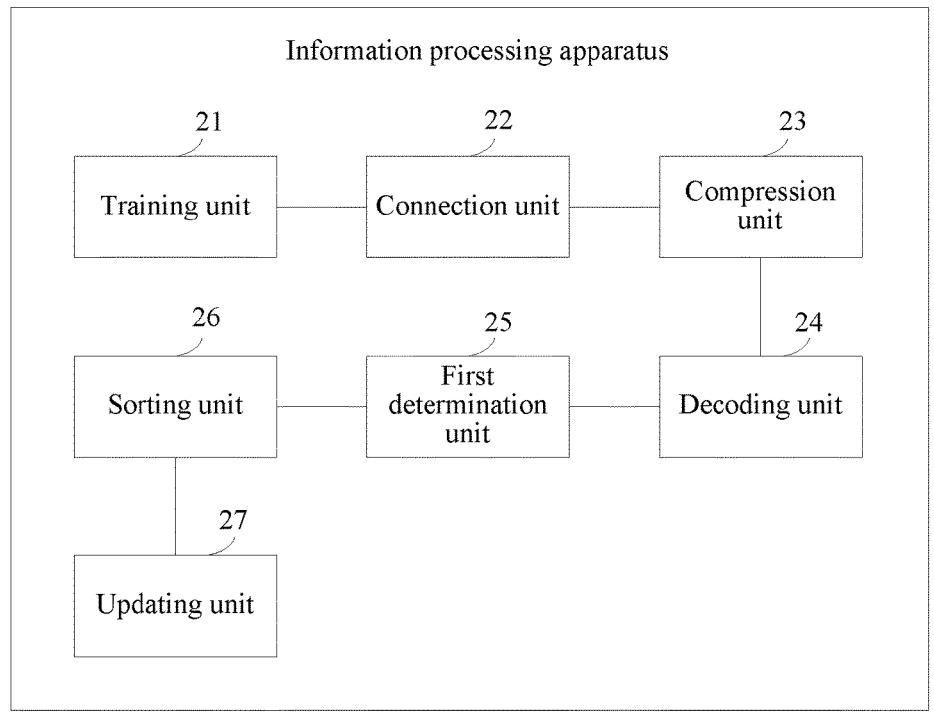
FIG. 2b is a second function structure diagram of an information processing apparatus according to various embodiments of the present disclosure.

As one implementation, as shown in FIG. 2b, on the basis of the apparatus shown in FIG. 2a, the apparatus may further include:

a sorting unit 25, configured to sort evaluation objects in the first opinion information according to the following dimensions in descending order. The number of times the evaluation objects in the first opinion information occur in an evaluation text; and the number of times the evaluation objects in the first opinion information are identified as evaluation object positive examples;

an updating unit 26, configured to select M evaluation objects, in descending order, from the evaluation objects sorted in descending order, and determine the selected M evaluation objects as a subset of the evaluation object seed, M being an integer greater than 1; and the training unit 21 is further configured to train the DNN by using the evaluation object seed, the evaluation term seed and the evaluation relationship seed after updating the parameter set of the DNN.

As one implementation, the connection unit 22 is further configured to, at the first input layer of the DNN after updating the parameter set of the DNN, connect vectors corresponding to the candidate evaluation object, the candidate evaluation term and the candidate evaluation relationship to obtain a third input vector;

the compression unit 23 is further configured to, at the first hidden layer of the DNN after updating the parameter set of the DNN, compress the third input vector to obtain a third middle vector;

the decoding unit 24 is further configured to, at the first output layer of the DNN after updating the parameter set of the DNN, decode the third middle vector to obtain a third output vector; and the first determination unit 25 is further configured to determine whether a decoding error value of the third output vector is less than a decoding error value threshold, if yes, determine the candidate evaluation object, the candidate evaluation term and the candidate evaluation relationship corresponding to the third output vector as second opinion information.

As one implementation, the first determination unit 25 is further configured to, before determining the first output vector whose decoding error value is less than a decoding error value threshold, determine the decoding error value threshold according to the following dimensions:

target precision of opinion information extracted from an evaluation text; and target quantity of the opinion information extracted from the evaluation text; wherein the decoding error value threshold is negatively correlated with the target precision, and is positively correlated with the target quantity.

Figure 2C:
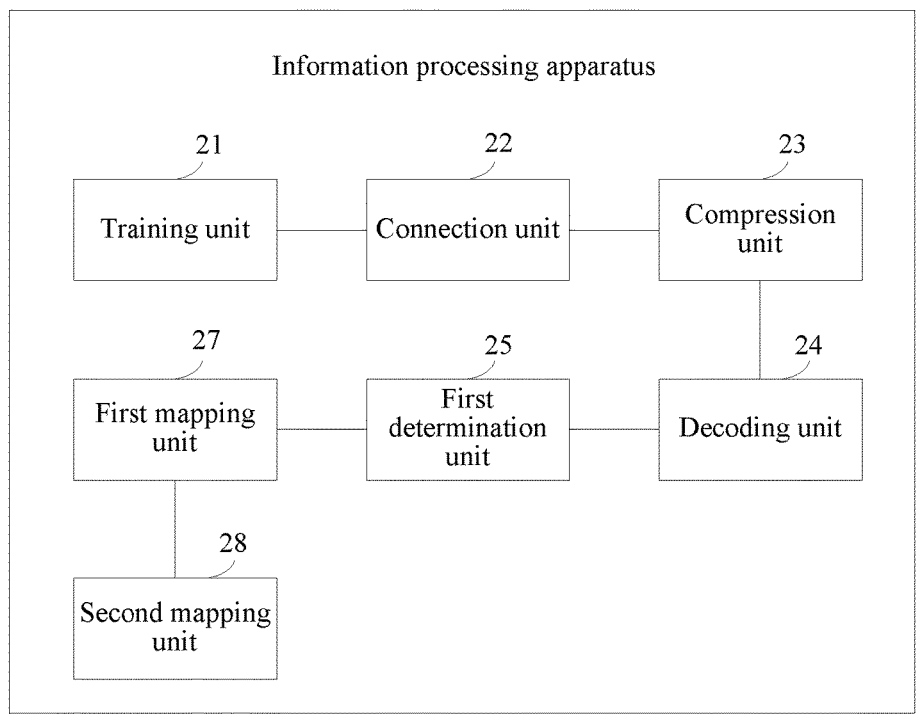
FIG. 2c is a third function structure diagram of an information processing apparatus according to various embodiments of the present disclosure.

As one implementation, as shown in FIG. 2c, on the basis of the apparatus shown in FIG. 2a, the apparatus further includes:

a first mapping unit 27, configured to map the candidate evaluation object and the candidate evaluation term into corresponding vectors by using the DNN; and a second mapping unit 28, configured to, at a second hidden layer to an nth hidden layer of the DNN, recursively map objects included in a syntactic dependency path of the evaluation relationship into vectors; wherein a Euclidean distance between any two vectors in the vectors obtained through mapping is positively correlated with a semantic or syntactic LRT index of the any two vectors, n is a positive integer, and n corresponds to the number of the objects included in the syntactic dependency path of the evaluation relationship.

Figure 2D:
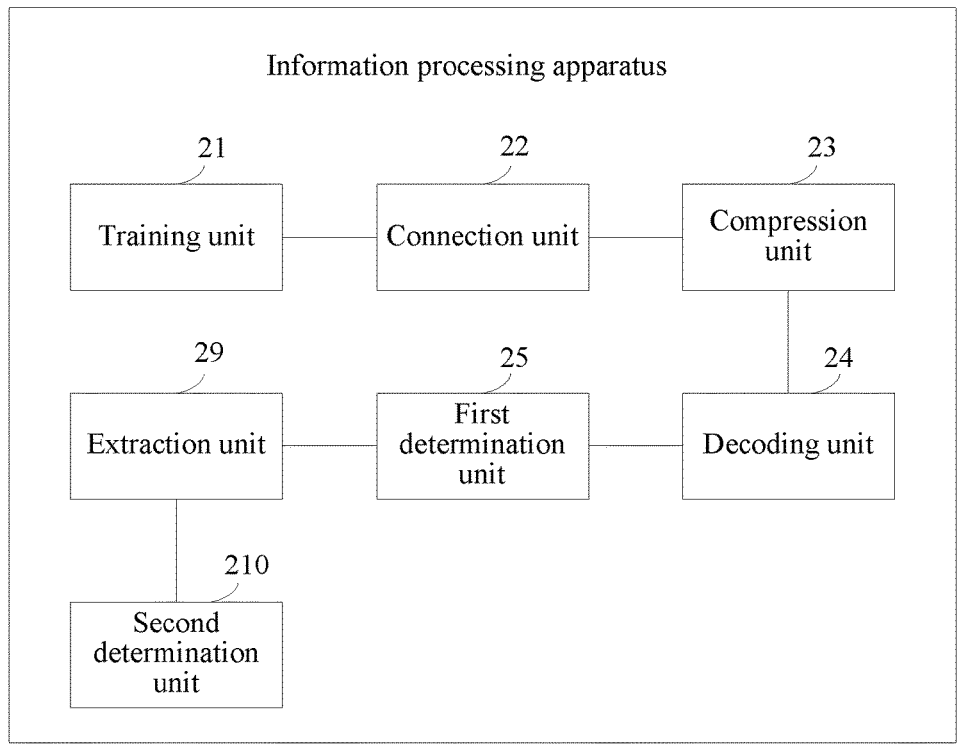
FIG. 2d is a fourth function structure diagram of an information processing apparatus according to various embodiments of the present disclosure.

As one implementation, as shown in FIG. 2d, on the basis of the apparatus shown in FIG. 2a, the apparatus may further include:

an extraction unit 29, configured to extract nouns from the evaluation text; and a second determination unit 210, configured to determine an LRT index between an initial evaluation object seed and the nouns extracted from the evaluation text; and determine nouns in the extracted nouns the LRT index between which and the initial evaluation object seed is greater than an LRT index threshold as a subset of the evaluation object seed.

It should be noted that, the technical features of information processing performed by the information processing apparatus correspond to those described in the method embodiment, and reference can be made to the description in the method embodiment for details not disclosed in the apparatus embodiment.

It should be noted that, the information processing apparatus described in the embodiment of the present invention can be run in one or more servers, and units in the information processing apparatus can be implemented by a Central Processing Unit (CPU) and a co-processing computer card in the information processing apparatus.

Figure 3:
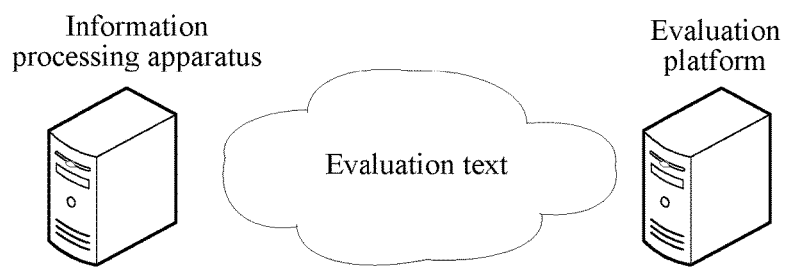
FIG. 3 is a topological diagram of connection between an information processing apparatus and an evaluation platform according to various embodiment of the present disclosure.

Description is given below in combination with an actual processing scenario, as shown in FIG. 3, the information processing apparatus (which can also be regarded as an opinion mining apparatus) is in a data connection with a server where an evaluation platform is run, so as to acquire an evaluation text in a certain field from the server of the evaluation platform to carry out opinion mining and output opinion information, herein, the evaluation platform may be any product evaluation platform (such as Taobao's or Amazon's evaluation platform), as the current evaluation platform always stores evaluation information of products based on categories and models of the products, the information processing apparatus described in the various embodiments of the present disclosure can directly acquire an evaluation text in a certain field from a server where an evaluation platform is run, and processing performed by the information processing apparatus is described below.

Step 1: Acquire seeds. It is necessary to acquire seeds before the evaluation text from the evaluation platform is processed. The acquired seeds include an evaluation term seed, an evaluation object seed, and an evaluation relationship seed. The evaluation term seed, the evaluation object seed, and the evaluation relationship seed can constitute opinion information (also referred to as evaluation phrase).

For the evaluation term seed, the information processing apparatus acquires independent evaluation terms in 186 fields (corresponding to different products) from a Senti-WordNet as an evaluation term seed set OS.

For the evaluation object seed, the information processing apparatus uses an LRT index to determine the evaluation object seed.

By taking an evaluation object seed in the mp3 field as an example, first, the information processing apparatus takes a noun or a noun phrase as an evaluation object, and uses a Tokenizer (such as Stanford Tokenizer) to word-segment the evaluation text, to obtain a noun set $\{T_i\}$;

second, based on an initial evaluation object seed set $\{T_i\}$ in the mp3 field ($T_i$ corresponds to product attributes of mp3, for example, storage capacity, size, hardware configuration and the like), an LRT index between $T_i$ and a noun set $\{T_j\}$ extracted from the evaluation text in the mp3 field are determined;

next, a preset number of $T_j$ with the highest LRT index are combined with an initial object seed set $\{T_i\}$, to serve as an evaluation object seed set TS; the LRT index reflects correlation between $T_j$ and an initial evaluation object seed T, that is to say, the higher the correlation between $T_j$s is, the greater the probability that $T_j$ represents product attributes in the mp3 field is, therefore, in the various embodiments of the present disclosure, the initial evaluation object seed set $\{T_i\}$ in the mp3 field is expanded according to the mp3 evaluation text, so as to determine corresponding evaluation objects according to different evaluation texts in actual applications, which overcomes the defect that an evaluation object distribution coefficient causes extracted opinion information to be one-sided. One example of the LRT index is as shown in Formula (1) below:

$$LRT=2 \log L(p_1,k_1,n_1)+\log L(p_2,k_2,n_2)-\log L(p,k_1,n_1)-\log \{p,k_2,n_2\} \quad (1)$$

where $k_1$=tf $(T_i,T_j)$, $k_2$=tf $(T_i,T_j)$, $k_3$=tf $(T_i,T_j)$, $k_4$=tf $(T_i,T_j)$, and tf ( ) denotes the occurrence frequency; $L(p,k,n)=p^k(1-p)^{n-k}$, $n_1=k_1+k_3$, $n_2=k_2+k_4$, $p_1=k_1/n_1$, and $p_2=k_2/n_2$.

It should also be noted that, for the evaluation text, as evaluation objects may occur in a multiple-word-connection form, the information processing apparatus may segment a noun word group in the evaluation text into single nouns, it is necessary to first detect noun phrases in the evaluation text and combine the phrases into one term. In application, the noun phrases can be determined based on a co-occurrence statistical manner, that is, multiple continuous nouns whose occurrence frequency exceeds a certain threshold are connected into a noun phrase t, and one example of the occurrence frequency is as shown in Formula (2) below:

$$CValue(t) = \log(|t|) \times tf(t) \text{ when } t \text{ is included by another phrase}$$

$$CValue(t) = \log(|t|) \times tf(t) - \frac{1}{n(L)}\sum_{l \in L} tf(l)$$

when $t$ is not included by another phrase where |t| denotes the number of terms included in t, tf (t) denotes the number of times t occurs in the evaluation text, L denotes all possible phrase sets including t, and n (L) indicates the number of the sets L.

For the evaluation relationship seed, as an evaluation relationship in the evaluation text can be represented with a syntactic dependency in a sentence of the evaluation text, the information processing apparatus can extract an evaluation relationship template from the evaluation text as an initial evaluation relationship seed set RS, a description is given as follows.

Figure 4:
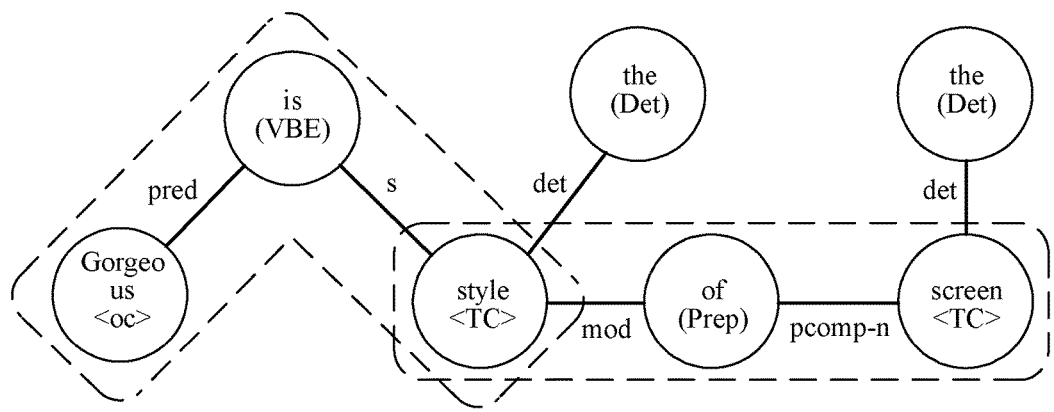
FIG. 4 is a diagram of a syntactic dependency path according to various embodiments of the present disclosure.

First, syntactic dependency analysis is performed on all sentences in the evaluation text, and then an evaluation relationship template is extracted from a syntactic dependency path through a template extraction technology (e.g., evaluation relationship graph walk algorithm). FIG. 4 illustrates a syntactic dependency path of an example sentence "The style of the screen is gorgeous", in order to extract the evaluation relationship template, terms in the sentence are replaced with wildcard characters at first, herein, a wildcard character <TC> is used to represent a candidate evaluation object, <OC> is used to represent a candidate evaluation term, "gorgeous" and "screen" in FIG. 4 are respectively replaced with <OC> and <TC>, and other words in the syntax tree are replaced with corresponding parts of speech tags. Description is given below with a template example.

TC-TC template: The template corresponds to a situation where two, juxtaposed evaluation objects are extracted, for example, in an example sentence "both color and style of the dress are pretty good", color and style are two juxtaposed evaluation objects.

OC-TC template: The template corresponds to a situation where one evaluation term modifies one evaluation object, for example, in an example sentence "fabrics of the dress are great", "fabrics" is an evaluation object and "great" is an evaluation term.

OC-OC template: The template corresponds to a situation where two evaluation terms are juxtaposed.

In the process that the information processing apparatus extracts a template, the shortest path from a candidate evaluation term <OC> to a candidate evaluation object <TC> in the syntax tree is taken as an evaluation relationship template, referring to FIG. 3, the shortest path between two <TC> in FIG. 3 is <TC>-{mod}-(Prep)-{pcomp-n}-<TC>, which corresponds to a TC-TC template; the shortest path from <OC> to <TC> in FIG. 3 is <OC>-{pred}-(VBE)-{s}<TC>, which corresponds to an OC-TC template.

During actual applications, the longer the template extracted by the information processing apparatus is, the lower the semantic accuracy expressed by the template is. Therefore, the information processing apparatus can extract the template according to a template length threshold, for example, when the template length threshold is 4, the template extracted by the information processing apparatus includes 4 terms at most. The information processing apparatus can also sort the extracted templates according to occurrence frequency in the evaluation text, and takes a template whose occurrence frequency exceeds a preset threshold as an evaluation relationship template seed.

As the opinion information is in a phrase form, the opinion information is equivalent to an evaluation phrase. Correspondingly, in the various embodiments of the present disclosure, the information processing apparatus can use the following manner to indicate the obtained seed set: $s_e=\{s_o, s_t, s_r\}$, where $s_o \in OS$, $s_t \in TS$, and $s_r \in RS$.

Step 2: Extract candidate opinion information based on an evaluation text

In the various embodiments of the present disclosure, one opinion information is represented in the following manner, e={o,t,r}; where o is an evaluation term (words expressing user opinion polarity, which can be understood as polarity sentiment words), t is an evaluation object (generally functions or attributes of a product), and r (i.e., the evaluation term is used for modifying the evaluation object) indicates that the evaluation term o is used for modifying the evaluation object t. In one example of the opinion information, in "this mp3 has clear screen", o={clear}, t={screen}, and r indicates that clear is used for modifying screen; as the opinion information is in a phrase form, candidate opinion information is extracted from an evaluation text (also referred to as corpus), equivalent to extracting a candidate evaluation phrase in the evaluation text from the evaluation platform.

As a candidate evaluation phrase is often in a verb or adjective form and the candidate evaluation object is often in a noun form, the information processing apparatus described in the embodiment of the present invention extracts a noun from the evaluation text as a candidate evaluation object and extracts a verb or adjective as a candidate evaluation term, and a candidate evaluation object set C can be represented in the following manner: C={OC, TC}; where OC denotes a candidate evaluation term, and TC denotes a candidate evaluation object.

Correspondingly, a candidate evaluation phrase set can be represented in the following manner: $c_e=\{c_o,c_t,c_r\}$, where $c_o \in OC$, $c_t \in TC$, and a candidate evaluation relationship between $c_o$ and $c_t$ can be determined by the information processing apparatus based on a syntactic dependency path in the evaluation text, which has been described in detail in step 1 and is not repeated herein.

Step 3: Word vector learning. That is, the evaluation term seed, the evaluation object seed, the candidate evaluation object, and the candidate evaluation term determined in the above steps are mapped into word vectors (also referred to as word representation). A word vector is a mathematical object corresponding to each word. The word vector can be represented in a vector form, each dimension of the word vector carries certain potential syntactic or semantic information of the word, and word vector learning means mapping a word to a high-dimensional space to obtain a corresponding word vector. The word vector learning in the step is aimed at when two words are syntactically or semantically closer, a Euclidean distance between word vectors of the two words is smaller.

The information processing apparatus uses a real matrix LT to represent word vectors of $|V_w|$ words, the number of dimensions of each word vector is n, and correspondingly, $LT \in \square^{n \times |V_w|}$, that is to say, LT is made up of word vectors of $|V_w|$ words, the ith column of the matrix LT corresponds to a word vector of the ith word $T_i$ in the $|V_w|$ words, each dimension of the ith column of the matrix LT carries potential syntactic or semantic information of the word $T_i$, and the word vector $x_i$ of $T_i$ can be represented with $x_i=LTb_i$, where $b_i \in \square^{|V_w|}$; for the $|V_w|$ words, the process that the information processing apparatus obtains the real matrix LT is the training process of word vectors, when training of word vectors is completed to obtain the matrix LT, the syntactically or semantically closer any two words in the corresponding $|V_w|$ words in the matrix LT is, the smaller the Euclidean distance between word vectors of the two words is, and in order to meet the condition, by taking that word vector training is performed on the candidate term set C as an example, the information processing apparatus can train word vectors according to Formula (3):

$$\hat{\theta} = \underset{\theta}{\text{argmin}} \sum_{c \in C} \sum_{v \in V_w} \max\{0, 1 - s_\theta(c) + s_\theta(v)\} \quad (3)$$

where $s_\theta(c)$=the score of inputting c made by the DNN (c is a candidate evaluation term or candidate evaluation object); $s_\theta(v)$ $s_\theta(c)$=the score of inputting a random word v made by the DNN, C={OC, TC}, θ is a parameter set of the DNN used for training word vectors, the value of $\hat{\theta}$ represents semantic or syntactic correlation between c and v, the less the value of $\hat{\theta}$ is, the greater the syntactic correlation between c and v is, therefore, when the minimum value of $\hat{\theta}$ is obtained by traversing c and v, c and v corresponding to the minimum value of $\hat{\theta}$ are mapped into vectors with the minimum Euclidean distance.

Figure 5:
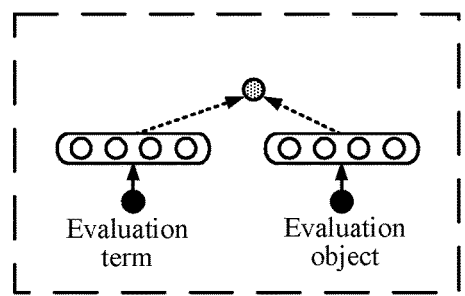
FIG. 5 is a diagram of word vector learning according to various embodiments of the present disclosure.

During implementation of the present disclosure, the DNN is a very effective tool for allowing the information processing apparatus to carry out word vector learning. Moreover, during actual applications, it is difficult to obtain negative examples (which do not constitute evaluation terms, evaluation objects and evaluation relationships of opinion information in any field) in the evaluation text. Therefore, the various embodiments of the present disclosure use a One-Class Classification technology, that is, only positive examples are used (corresponding to determining an evaluation object seed, an evaluation term seed and an evaluation relationship seed in step 1 to determine opinion information in the evaluation text. That is to say, the various embodiments of the present disclosure fuse a DNN technology and the One-Class Classification technology into a One-Class Classification DNN (OCDNN) technology. The following describes that the information processing apparatus uses the OCDNN technology to perform processing of word vector learning, as shown in FIG. 5, by taking that an evaluation term and an evaluation object are mapped into word vectors. As an example, the evaluation term herein includes the evaluation term seed acquired in step 1 and the candidate evaluation term acquired in step 2, and the evaluation object includes the evaluation object seed acquired in step 1 and the candidate evaluation object acquired in step 2; as shown in FIG. 5, each empty circle in FIG. 5 represents a computing unit of the DNN, each computing unit carries training of one dimension of a word vector of the evaluation term or evaluation object (corresponding to a solid circle), the training (corresponding to a vertical line shadow circle) is aimed at making the Euclidean distance between word vectors syntactically or semantically close to each other minimum; during actual applications, word vector training can be performed according to the standard shown in Formula (3).

Step 4: Obtain vector representation of an evaluation relationship. Similar to the processing in step 3, the step is aimed at mapping an evaluation relationship into a vector (including the evaluation relationship seed obtained in step 1 and the candidate evaluation relationship obtained in step 3).Aas shown in FIG. 6, the evaluation relationship includes three objects (corresponding to solid circles), and the computing unit iteratively merges the three objects according to a syntactic dependency path (i.e., syntactic dependency between the three objects), to map the three objects into vectors representing an evaluation relationship.

Figure 7:
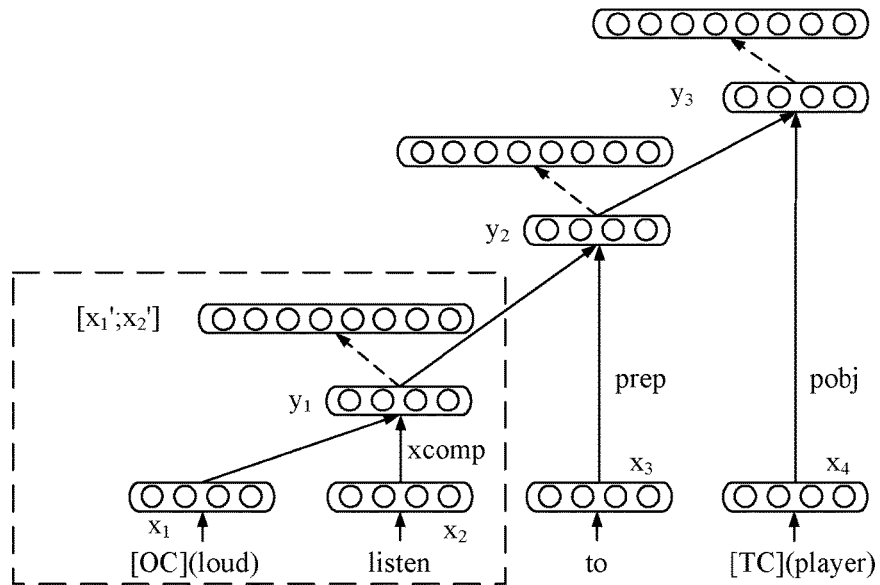
FIG. 7 is a second diagram of obtaining a vector corresponding to an evaluation relationship by using a DNN according to various embodiments of the present disclosure.

One diagram showing that an evaluation relationship is mapped into a vector according to a syntactic dependency path is shown in FIG. 7. For an example sentence "too loud to listen to the player", the information processing apparatus determines a syntactic dependency path between an evaluation term $c_o$ (loud) and an evaluation object $c_t$ (player), as it is only necessary to focus on syntactic dependency between objects (corresponding to words) during processing of an evaluation relationship, $c_o$ and $c_t$ are correspondingly replaced with wildcard characters OC and TC; starting from OC, along a syntactic dependency path, objects included in the syntactic dependency path are gradually mapped into vectors, until traversal of the syntactic dependency path is completed; for the syntactic dependency path shown in FIG. 7: [OC] (loud)-listen-to-[TC] (player), at first, [OC] (corresponding to $x_1$) and listen (corresponding to $x_2$) are mapped into a vector $y_1$, and then $y_1$ and "to" (corresponding to $x_3$) are merged to obtain a vector $y_2$, and $y_2$ and [TC] (corresponding to $x_4$) are merged to obtain a vector $y_3$. Thus, the evaluation relationship corresponding to the syntactic dependency path shown in FIG. 7 is mapped into a vector $y_3$, and the following describes specific implementation:

1) [OC] (corresponding to $x_1$) and listen (corresponding to $x_2$) are mapped into a vector $y_1$.

The dotted box in FIG. 2 illustrates a process of mapping OC (corresponding to $x_1$) and "listen" (corresponding to $x_2$) to a n-dimension vector (corresponding to $y_1$), and it can be seen from FIG. 7 that the number of nodes (i.e., computing units) of an input layer (corresponding to OC and "listen") is equal to the number of nodes of an output layer (corresponding to $y_1$), as each computing unit carries training of one dimension of the vector, it is equivalent to compressing syntactic or semantic features of OC (corresponding to $x_1$) and "listen" (corresponding to $x_2$) into the vector $y_1$, and $y^1$ can be represented with Formula (4):

$$y_1 = f(W^{(dep)}[x_1; x_2] + b) \tag{4}$$

where $[x_1; x_2]$ denotes connection of vectors corresponding to OC (corresponding to $x_1$) and "listen" (corresponding to $x_2$), f ( ) denotes a sigmoid function, $W^{(xcomp)}$ denotes a parameter matrix corresponding to syntactic dependency, i.e., an object complement (xcomp) relationship, between $x_1$ and $x_2$, and an initial value of $W^{(xcomp)}$ is as shown by Formula (5):

$$W^{(dep)} = 1/2[I_1; I_2; I_b] + \varepsilon \tag{5}$$

where $I_1$ corresponds to the syntactic dependency (i.e., the xcomp between $x_1$ and $x_2$), $I_1$ denotes a n-order matrix, $I_2$ denotes a n-dimension space vector, and $\varepsilon$ is generated from uniform distribution U [−0.001, 0.001].

2) $y_1$ and "to" (corresponding to $x_3$) are mapped into a vector $y_2$.

The number of nodes (i.e., computing units) of an input layer (corresponding to $y_1$ and "to") is equal to the number of nodes of an output layer (corresponding to $y_1$), as each computing unit carries training of one dimension of the vector, it is equivalent to compressing syntactic or semantic features of $y_1$ and "to" into the vector $y_2$, and $y_2$ can be represented with Formula (6):

$$y_2 = f(W^{(prep)}[y_1; x_3] + b) \tag{6}$$

where $[y_1; x_3]$ denotes connection of vectors corresponding to $y_1$ and "to" (corresponding to $x_3$), f ( ) denotes a sigmoid function, $W^{(prep)}$ denotes a parameter matrix corresponding to syntactic dependency, i.e., a prep relationship, between $y_1$ and $x_3$, and an initial value of $W^{(prep)}$ is as shown by Formula (7):

$$W^{(prep)} = 1/2[I_3; I_4; I_b] + \varepsilon \tag{7}$$

where $I_3$ corresponds to the syntactic dependency (i.e., the xcomp between $x_1$ and $x_2$), $I_3$ denotes a n-order matrix, $I_4$ denotes a n-dimension space vector, and $\varepsilon$ is generated from uniform distribution U [−0.001, 0.001].

3) $y_2$ and [TC] (corresponding to $x_4$) are mapped into a vector $y_3$.

The number of nodes (i.e., computing units) of an input layer (corresponding to $y_2$ and [TC]) is equal to the number of nodes of an output layer (corresponding to $y_4$), as each computing unit carries training of one dimension of the vector, it is equivalent to compressing syntactic or semantic features of $y_2$ and [TC] into the vector $y_3$, and $y_3$ can be represented with Formula (8):

$$y_3 = f(W^{(prep)}[y_2; x_3] + b) \tag{8}$$

where $[y_2; x_3]$ denotes connection of vectors corresponding to $y_2$ and [TC] (corresponding to $x_4$), f ( ) denotes a sigmoid function, $W^{(pobj)}$ denotes a parameter matrix corresponding to syntactic dependency, i.e., a pobj relationship, between $y_1$ and $x_3$, and an initial value of $W^{(pobj)}$ is as shown by Formula (9):

$$W^{(pobj)} = 1/2[I_5; I_6; I_b] + \varepsilon \tag{9}$$

where $I_5$ corresponds to the syntactic dependency (i.e., the xcomp between $y_1$ and $x_3$), $I_6$ denotes a n-order matrix, $I_4$ denotes a n-dimension space vector, and $\varepsilon$ is generated from uniform distribution U [−0.001, 0.001].

4) Train $W^{(xcomp)}$, $W^{(prep)}$ and $W^{(pobj)}$

Steps 1 to 3 are repeated to adjust values of $W^{(xcomp)}$, $W^{(prep)}$ and $W^{(pobj)}$, to minimize a Euclidean distance between an input layer and an output layer of a recursive decoder corresponding to Formulas (10), (11) and (12);

$$E_{rae1}=\|[x_1;x_2]-[x_1';x_2']\|^2 \qquad (10)$$

$$E_{rae2}=\|[y_1;x_3]-[y_1';x_3']\|^2 \qquad (11)$$

$$E_{rae3}=\|[y_2;x_4]-[y_2';x_4']\|^2 \qquad (12)$$

where $E_{rae1}$ denotes a Euclidean distance between an input layer $x_1;x_2$ and a decoding (the decoding process is represented with dotted lines in FIG. 7) value $[x_1';x_2']$ of an output layer $[x_1;x_2]$, $[x_1';x_2']=yW_1^{(out)}$, and an initial value of $W_1^{(out)}$ is $W^{(xcomp)t}$; denotes a Euclidean distance between $[y_1;x_3]$ of the input layer and a decoding (the decoding process is represented with dotted lines in FIG. 7) value $[y_1';x_3']$ of the output layer, $[y_1';x_3']=y_2W_2^{(out)}$, and an initial value of $W_2^{(out)}$ is $W^{(prep)t}$; $E_{rae3}$ denotes a Euclidean distance between an input layer $[y_2;x_4]$ and a decoding (the decoding process is represented with dotted lines in FIG. 7) value $[y_2';x_4']$ of an output layer $[y_2;x_4]$, $[y_2';x_4']=y_3W_3^{(out)}$, and an initial value of $W_3^{(out)}$ is $W^{(prep)t}$; during actual applications, steps 1) to 3) can be performed multiple times, each time $y_1$, $y_2$ and $y_3$ mapped by the hidden layer are decoded at the output layer, the updated $w_1^{(out)}$, $W_2^{(out)}$ and $W_3^{(out)}$ are always used to correspondingly decode $y_1$, $y_2$ and $y_3$; in FIG. 7, when $W^{(xcomp)}$, $W^{(prep)}$ and $W^{(pobj)}$ are trained, $W_1^{(out)}$, $W_2^{(out)}$ and $W_3^{(out)}$ will be used to correspondingly recursively decode $y_1$, $y_2$ and $y_3$, and thus the DNN shown in FIG. 7 can be regarded as a recursive self-decoder.

Step 4: Train the DNN, to extract first opinion information.

1) Train the DNN

Figure 8:
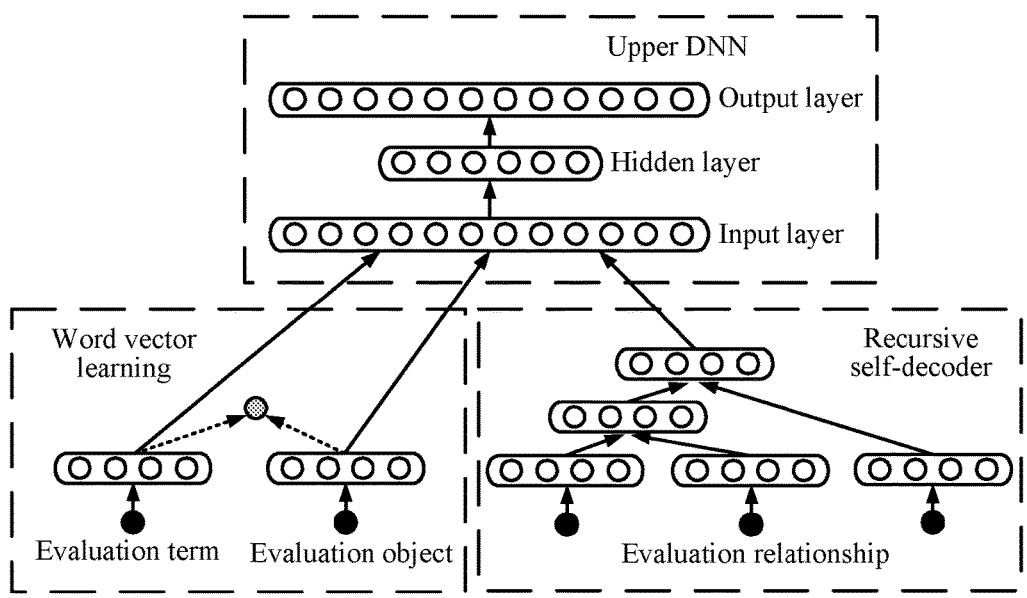
FIG. 8 is a diagram of extracting opinion information by using a DNN according to various embodiments of the present disclosure.
Figure 9A:
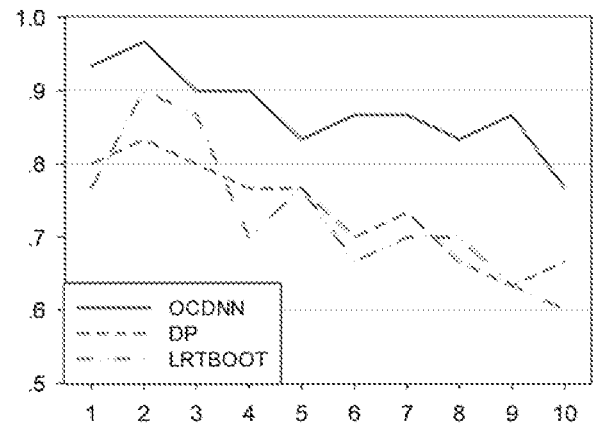
FIG. 9a-FIG. 9d are diagrams of comparison between precision of extracting opinion information by using a DNN and precision of extracting the opinion information by using the related art according to various embodiments of the present disclosure.
Figure 9B:
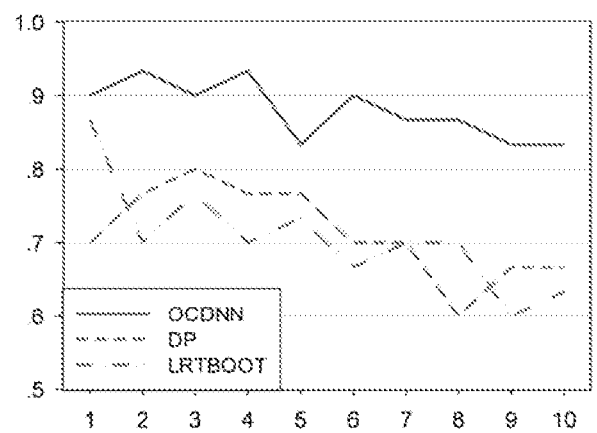
Figure 9C:
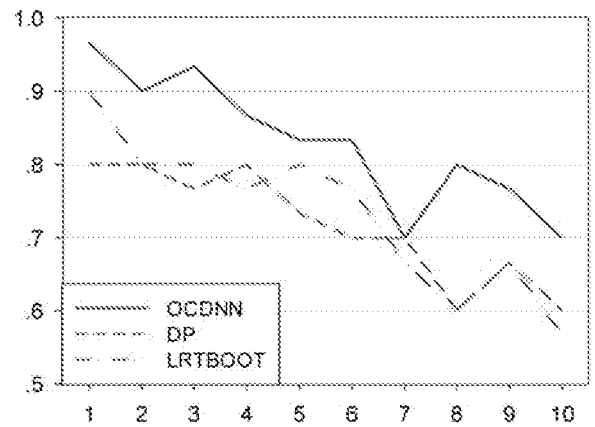
Figure 9D:
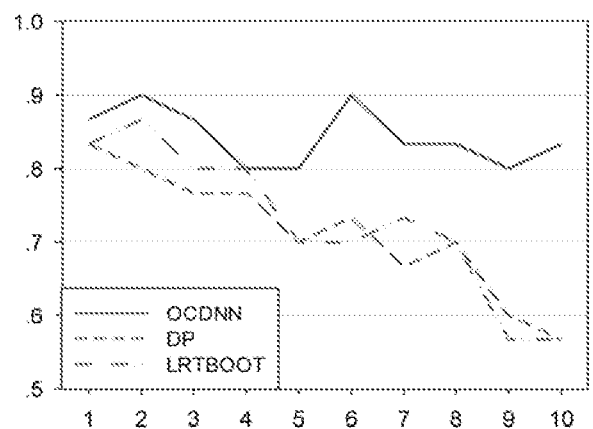

Vectors $c_e=\{c_o,c_t,c_r\}$ corresponding to the evaluation term seed, the evaluation object seed and the evaluation relationship seed $s_e=\{s_o,s_t,s_r\}$ are connected at an input layer of an upper neural network shown in FIG. 8, a vector input by the input layer is compressed at the hidden layer, to minimize a Euclidean distance between a vector obtained after the output layer decodes and outputs the compressed vector and the vector before compression.

2) Extract First Opinion Information.

Figure 6:
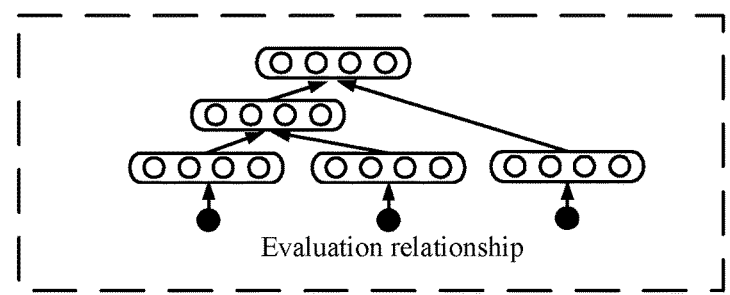
FIG. 6 is a first diagram of obtaining a vector corresponding to an evaluation relationship by using a DNN according to various embodiments of the present disclosure.

As shown in FIG. 8, the vectors $v_o$ and $v_t$ corresponding to the evaluation term seed and the evaluation object seed obtained through word vector learning shown in FIG. 6 and the vector $v_r$ of the evaluation relationship seed obtained through the self-decoder shown in FIG. 7 are connected into a vector $v_e=(v_o,v_t,v_r)$ at the input layer of the upper DNN shown in FIG. 8. Moreover, the number of nodes of the hidden layer of the upper DNN is less than that of the input layer, as each node carries an operation of one dimension of the vector, a vector whose dimension is less than a dimension of $v_e$ will be obtained in the hidden layer by using such as "bottleneck" network structure, that is, semantic or syntactic features of the vector $v_e$ input by the input layer are compressed at the hidden layer; at the output layer of the upper decoder of the DNN, a vector obtained by the hidden layer after the vector $v_e$ is compressed is decoded and output, as the number of nodes of the output layer is the same as that of the input layer, each node is used for carrying an operation of one dimension of the vector $v_e$, the dimension of a decoding vector of the vector $v_e$ obtained at the output layer is the same as that of the vector $v_e$, and the upper DNN shown in FIG. 8 implements compression and decoding functions, which may also be regarded as a self-decoder.

The structure of the self-decoder shown in FIG. 8 is described below. During implementation of the present disclosure, for the self-decoder shown in FIG. 8, if one positive example opinion information is input at the input layer, that is, the vector $v_e=(v_o,v_t,v_r)$ corresponding to $s_e=\{s_o,s_t,s_r\}$, as, in $v_e=(v_o,v_t,v_r)$, the closer the semantic or syntactic features between vectors are, the smaller the Euclidean distance between the vectors is (refer to step 3 for details), semantic or syntactic features of an opinion information positive example can be well decoded at the output layer (that is, a less decoding error value will be obtained). Alternatively, if a vector corresponding to one negative example opinion information is input at the input layer, the decoding error value of the vector output at the output layer will be greater than that of the vector corresponding to the positive example opinion information, thus leading to failure of decoding at the output layer. Accordingly, the process of extracting opinion information (i.e., evaluation phrases) from an evaluation text can be converted to a process of verifying an output vector whose decoding error value is less than a decoding error value threshold at the output layer when a vector $v_c=(v_{co},v_{ct},v_{cr})$ corresponding to a candidate evaluation term, a candidate evaluation object, and a candidate evaluation relationship is input at the input layer, that is, the evaluation term, the evaluation object, and the evaluation relationship corresponding to the output vector whose decoding error value is less than a decoding error value threshold is taken as first opinion information.

The information processing apparatus can filter the vectors output by the output layer according to a decoding error value threshold $\vartheta$, and output a candidate evaluation term, a candidate evaluation object, and a candidate evaluation relationship corresponding to a vector in the output vectors whose decoding error value is less than $\vartheta$ as first opinion information.

During actual applications, the value of $\vartheta$ can be determined by introducing an evaluation object negative example, for example, common nouns, for example, "thing" and "one", which are not evaluation objects, can be used as an evaluation object negative example GN, an evaluation object positive example VO is acquired from the SentiWordNet, and the value of $\vartheta$ is determined according to Formulas (13) and (14):

$$E_\vartheta = \sum_{t \in GN \cap PE}[pp(t)-0]^2 + \sum_{o \in VO \cap PE}[pp(o)-1]^2 \qquad (13)$$

$$pp(t) = tf^+(t)/tf(t), PE = \{c_e \mid E_r(c_e) < \vartheta\} \qquad (14)$$

where PE denotes opinion information, the opinion information (including evaluation terms, evaluation objects and evaluation relationships) corresponds to a vector in the vectors output by the output layer whose decoding error value is less than $\vartheta$, $E_r(\ )$ is a decoding error value of the output layer, tf (t) is the number of times the evaluation object t occurs in PE, and $tf^+$ (t) is the number of times the evaluation object t is correctly identified as an evaluation object positive example; pp(t) is a ratio of the number of times the evaluation object t in PE is identified as an evaluation object positive example to the number of times the evaluation object occurs in the evaluation text, $E_\vartheta$ is positively correlated with $E_\vartheta$ represents precision of extracting opinion information from the evaluation text by the information processing apparatus, the less $E_\vartheta$ is, the higher the precision of extracting opinion information is, but the number of the extracted opinion information is less, the greater $E_\vartheta$ is, the lower the precision of extracting opinion information is, and the number of the extracted opinion information is correspondingly more (i.e., the proportion of identifying evaluation object negative samples as evaluation object positive samples increases). Therefore, the value of $\vartheta$ can be adjusted according to actual requirements. For example, in Scenario 1, when the requirement for the precision of opinion information output by the output layer is higher but no attention is paid to the number of the opinion information output, $\vartheta$ can be set as a higher value, for example, 0.1, and at this time, a vector, whose decoding error value is less than 0.1, in the vectors obtained through decoding of the output layer corresponds to the first opinion information. In Scenario 2, when the requirement for the precision of opinion information output by the output layer is lower than that in Scenario 1 and it is necessary to output more opinion information than Scenario 1, $\vartheta$ can be set as a value greater than that in Scenario 1, for example, 0.2, and at this time, a vector, whose decoding error value is less than 0.2, in the vectors obtained through decoding of the output layer corresponds to the first opinion information.

It can be seen that, as the output vectors of the output layer include an evaluation term, an evaluation object and an evaluation relationship at the same time, and the information processing apparatus filters the output vectors according to a decoding error value at the output layer of the upper DNN, equivalent to jointly verifying a candidate evaluation term, a candidate evaluation object, and a candidate evaluation relationship, to obtain opinion information, which, compared with that only two of the evaluation term, the evaluation object and the evaluation relationship are verified in the related art, the precision of extracting opinion information is higher.

It should be noted that, in step 4, as the information processing apparatus uses the recursive self-decoder shown in FIG. 8 to merge a word vector of each word in the evaluation relationship through a syntactic dependency path, a vector output by the information processing apparatus whose decoding error value is less than the threshold $\vartheta$ will include opinion information indicating that the evaluation relationship and the evaluation relationship seed are structurally similar, which is equivalent to expanding the evaluation relationship seed, and avoids the problem that sparse distribution of the evaluation relationship seed causing the opinion information to be incomplete.

Step 5: Re-train the DNN, to extract second opinion information.

That is, a new evaluation object seed is acquired from the first opinion information to be merged into an evaluation object seed set TS, to use the TS as a new evaluation object seed to re-train the DNN, upon completion of the training, vectors corresponding to candidate evaluation terms, candidate evaluation objects and candidate evaluation relationships are connected into a vector $v_c=(v_{co},v_{ct},v_{cr})$ at the input layer of the upper DNN shown in FIG. 8, which is compressed at the hidden layer and is decoded at the output layer, and candidate evaluation terms, candidate evaluation objects, and candidate evaluation relationships corresponding to vectors whose decoding error values are less than a decoding error value threshold are determined as second opinion information; detailed description is given below.

The evaluation objects t in the opinion information output in step 5 are arranged in descending order according to Formula (15):

$$s(t)=pp(t)\times \log tf(t) \quad (15)$$

where $pp(t)=tf^+(t)/tf(t)$ indicates the number of times t is identified as an evaluation object positive example, and $tf(t)$ indicates the number of times t occurs in an evaluation text;

s(t) reflects the number of times t occurs in the evaluation text and the number of times t is identified as an evaluation object positive example, when the number of times t occurs in the evaluation text and the number of times t is identified as an evaluation object positive example are greater, the probability that t is an evaluation object positive example is greater, on this basis, M evaluation objects t with the greatest s(t) are taken as evaluation object seeds to be incorporated into the evaluation object seed set TS in step 1, and the expanded TS is used to re-train the upper DNN shown in FIG. 8. After completion of training, vectors corresponding to the candidate evaluation object, the candidate evaluation term, and the candidate evaluation relationship are connected into a vector $v_c=(v_{co},v_{ct},v^{cr})$ at the input layer of the upper DNN shown in FIG. 8, which is compressed at the hidden layer and is decoded at the output layer, and candidate evaluation terms, candidate evaluation objects, and candidate evaluation relationships corresponding to vectors whose decoding error values are less than a decoding error value threshold are determined as second opinion information.

As the TS is expanded, during word vector learning, the defect of sparse distribution of evaluation objects in the TS can be overcome, so that the opinion information extracted in step 5 is more accurate.

In order to verify the influences of step 5 on the precision of extracting opinion information from the evaluation text, the inventor carries out the following experiment:

opinion information is extracted from evaluation texts in an MP3 field, a Hotel field, a Mattress field, and a Phone field according to the method described in the embodiment of the present invention by using the DNN technology, each time the opinion information is extracted, M evaluation objects t with the greatest s(t) are added to the evaluation object seed set TS to re-train the upper DNN shown in FIG. 8, and the opinion information is re-extracted from the evaluation texts in the fields;

the experiment is carried out by using a DP method and LRTBOOT in the prior art, every extraction precision is as shown by the vertical coordinates in FIG. 9a to FIG. 9d, and the horizontal coordinates indicate the ratio of M to the number of the opinion information extracted. It can be seen that the precision of extracting opinion information according to the method described in the embodiment of the present invention implemented with the DNN technology is evidently superior to the related art. Moreover, with the expansion of the evaluation object seed set TS, the precision of extracting opinion information according to the method described in the embodiment of the present invention implemented with the DNN technology will first rise and then fall, this is because more and more evaluation objects are added to the evaluation object set TS along with the expansion of the evaluation object seed set TS. Therefore, during application, step 6 can be performed only once, so as to avoid adding noise evaluation objects to the set TS as seeds to lead to a problem that precision of extracting opinion information is reduced.

In order to verify the beneficial effects brought about by the various embodiments of the present disclosure, the method described in the various embodiments of the present disclosure implemented with the DNN technology is compared with the AdjRule method, the DP method, the DP-HIT method, and the LRTBOOT method, and the following experiment is carried out:

A precision rate (denoted by P), a recall rate (denoted by R), and an F value are used to assess results of extracting evaluation terms and evaluation objects from evaluation texts with different methods, which are defined as follows:

P=the number of identified positive example words/the number of all the identified words R=the number of identified positive example words/the number of positive example words in the evaluation texts $$F=2PR/(P+R)$$

As shown in Table 1, when the same test data is used, the proportion of extracting positive example words in different fields according to the technical solution in the various embodiments of the present disclosure is superior to that according to the method in the related art,

TABLE 1

|  | MP3 | | | Hotel | | | Mattress | | | Phone | | | Average |
| --- | --- | --- | --- | --- | --- | --- | --- | --- | --- | --- | --- | --- | --- |
|  | P | R | F | P | R | F | P | R | F | P | R | F | |
|  | Evaluation object | | | | | | | | | | | | |
| AdjRule | 0.53 | 0.50 | 0.51 | 0.53 | 0.54 | 0.55 | 0.50 | 0.60 | 0.55 | 0.52 | 0.51 | 0.51 | 0.53 |
| DP | 0.63 | 0.52 | 0.57 | 0.61 | 0.56 | 0.58 | 0.55 | 0.60 | 0.57 | 0.60 | 0.53 | 0.56 | 0.57 |
| DP-HITS | 0.64 | 0.61 | 0.62 | 0.63 | 0.64 | 0.63 | 0.55 | 0.67 | 0.60 | 0.62 | 0.64 | 0.63 | 0.62 |
| LRTBOOT | 0.60 | 0.72 | 0.65 | 0.57 | 0.74 | 0.64 | 0.55 | 0.78 | 0.65 | 0.57 | 0.76 | 0.65 | 0.65 |
| OCDNN | 0.71 | 0.64 | 0.67 | 0.72 | 0.66 | 0.69 | 0.63 | 0.69 | 0.66 | 0.69 | 0.68 | 0.68 | 0.68 |
|  | Evaluation term | | | | | | | | | | | | |
| AdjRule | 0.48 | 0.60 | 0.53 | 0.50 | 0.61 | 0.55 | 0.51 | 0.68 | 0.58 | 0.48 | 0.61 | 0.54 | 0.55 |
| DP | 0.58 | 0.58 | 0.58 | 0.58 | 0.60 | 0.59 | 0.54 | 0.68 | 0.60 | 0.55 | 0.59 | 0.57 | 0.59 |
| LRTBOOT | 0.52 | 0.65 | 0.58 | 0.54 | 0.69 | 0.61 | 0.51 | 0.73 | 0.60 | 0.50 | 0.68 | 0.58 | 0.59 |
| OCDNN | 0.61 | 0.59 | 0.60 | 0.65 | 0.61 | 0.63 | 0.59 | 0.70 | 0.64 | 0.61 | 0.59 | 0.60 | 0.62 |

Table 2 and Table 3 give the proportion of extracting opinion information (including evaluation terms, evaluation objects and evaluation relationships) according to the technical solution in the various embodiments of the present disclosure. During application, the precision of extracting opinion information from an evaluation text is more convincing than the precision of simply identifying positive example evaluation terms and positive example evaluation objects, and it can be seen from Table 2 and Table 3 that the P, R, and F parameters achieved in the technical solution in the various embodiments of the present disclosure are superior to the P, R, and F parameters achieved in the related art. D1-D2 represent evaluation text test libraries in different fields.

TABLE 2

|  | D1 | | | D2 | | | D3 | | |
| --- | --- | --- | --- | --- | --- | --- | --- | --- | --- |
|  | P | R | F | P | R | F | P | R | F |
| AdjRule | 0.51 | 0.66 | 0.58 | 0.53 | 0.63 | 0.58 | 0.5 | 0.61 | 0.6 |
| DP | 0.66 | 0.63 | 0.64 | 0.68 | 0.6 | 0.64 | 0.69 | 0.62 | 0.7 |
| LRTBOOT | 0.53 | 0.7 | 0.6 | 0.57 | 0.72 | 0.64 | 0.55 | 0.69 | 0.6 |
| OCDNN | 0.76 | 0.66 | 0.71 | 0.74 | 0.67 | 0.7 | 0.77 | 0.67 | 0.7 |

|  | D4 | | | D5 | | | |
| --- | --- | --- | --- | --- | --- | --- | --- |
|  | P | R | F | P | R | F | average |
| AdjRule | 0.48 | 0.6 | 0.53 | 0.5 | 0.61 | 0.55 | 0.6 |
| DP | 0.66 | 0.57 | 0.61 | 0.67 | 0.6 | 0.63 | 0.6 |
| LRTBOOT | 0.52 | 0.7 | 0.6 | 0.65 | 0.68 | 0.61 | 0.6 |
| OCDNN | 0.7 | 0.65 | 0.67 | 0.77 | 0.66 | 0.71 | 0.7 |

TABLE 3

|  | MP3 | | | Hotel | | | |
| --- | --- | --- | --- | --- | --- | --- | --- |
|  | P | R | F | P | R | F | average |
| AdjRule | 0.49 | 0.55 | 0.52 | 0.45 | 0.53 | 0.49 | 0.50 |
| DP | 0.63 | 0.51 | 0.56 | 0.59 | 0.50 | 0.54 | 0.55 |
| LRTBOOT | 0.54 | 0.63 | 0.58 | 0.50 | 0.60 | 0.55 | 0.56 |
| OCDNN | 0.73 | 0.60 | 0.66 | 0.70 | 0.59 | 0.64 | 0.65 |

A person of ordinary skill in the art may understand that all or some of the steps of the foregoing various method embodiments may be implemented by a program instructing relevant hardware. The program may be stored in a computer readable storage medium, and during execution of the program, the execution includes the steps of the foregoing various method embodiments. The storage medium includes any medium that can store program codes, such as a mobile storage device, a random access memory (RAM), a read-only memory (ROM), a magnetic disk, or an optical disc.

When the integrated units of the present disclosure are implemented in a form of a software functional module and sold or used as an independent product, the integrated units may be stored in a computer-readable storage medium. Based on such an understanding, the technical solutions of the various embodiments of the present disclosure, or the part contributing to the related art, may be embodied in the form of a software product. The computer software product is stored in a storage medium and includes several instructions for instructing a computer device (which may be a personal computer, a server, or a network device) to perform all or a part of the steps of the methods in the various embodiments of the present disclosure. The foregoing storage medium includes any medium that can store program codes, such as a mobile storage device, a RAM, a ROM, a magnetic disk, or an optical disc.

The above descriptions are example implementations of the present disclosure, but the protection scope of the present disclosure is not limited thereto. Variations or replacements that can be easily thought of by any person skilled in the art within the technical scope disclosed in the present disclosure should be included in the protection scope of the present disclosure. Therefore, the protection scope of the present disclosure should be subject to the protection scope of the claims.

What is claimed is:

1. An information processing method, the method comprising:
    training, by a computing device, a Deep Neural Network (DNN) by using an evaluation object seed, an evaluation term seed and an evaluation relationship seed, the DNN comprising a first input layer, a first hidden layer and a first output layer, a number of nodes of the first input layer corresponding to that of the first output layer, and the number of nodes of the first input layer being greater than that of the first hidden layer;
    at the first input layer, connecting, by the computing device, vectors corresponding to a candidate evaluation object, a candidate evaluation term and a candidate evaluation relationship to obtain a first input vector, at the first hidden layer, compressing, by the computing device, the first input vector to obtain a first middle vector, and at the first output layer, decoding the first middle vector to obtain a first output vector;
    determining, by the computing device, whether a decoding error value of the first output vector is less than a decoding error value threshold, if yes, determining the candidate evaluation object, the candidate evaluation term and the candidate evaluation relationship corresponding to the first output vector as first opinion information;
    wherein at the first input layer of the DNN, before connecting vectors corresponding to the candidate evaluation object, the candidate evaluation term and the candidate evaluation relationship to obtain the first input vector, the method further includes:
        mapping, by the computing device, the candidate evaluation object and the candidate evaluation term into corresponding vectors by using the DNN; and
        at a second hidden layer to an nth hidden layer of the DNN, recursively mapping, by the computing device, objects comprised in a syntactic dependency path of the candidate evaluation relationship into vectors,
    wherein a Euclidean distance between any two vectors in the vectors obtained through mapping is positively correlated with a semantic or syntactic likelihood ratio test (LRT) index of the any two vectors, n is a positive integer, and n corresponds to the number of the objects comprised in the syntactic dependency path of the candidate evaluation relationship,
    wherein the training the DNN by using the evaluation object seed, the evaluation term seed and the evaluation relationship seed comprises:
        at the first input layer, connecting, by the computing device, vectors corresponding to the evaluation object seed, the evaluation term seed and the evaluation relationship seed to obtain a second input vector;
        at the first hidden layer, compressing, by the computing device, the second input vector to obtain a second middle vector; and
        updating, by the computing device, a parameter set of the DNN until a Euclidean distance between a second output vector and the second input vector is minimum, the second output vector being a vector obtained by decoding the second middle vector at the first output layer, and
    wherein the compressing and the decoding, by the computing device, are performed by implementing a recursive self-decoder which, each time the parameter set of the DNN is updated, recursively decode the first middle vector to obtain the first output vector.

2. The method according to claim 1, wherein the method further comprises:
    sorting, by the computing device, evaluation objects in the first opinion information according to the following dimensions in descending order: the number of times the evaluation objects in the first opinion information occur in an evaluation text, and the number of times the evaluation objects in the first opinion information are identified as evaluation object positive examples;
    selecting, by the computing device, M evaluation objects, in descending order, from the evaluation objects sorted in descending order, and determining the selected M evaluation objects as a subset of the evaluation object seed, M being an integer greater than 1; and
    training, by the computing device, the DNN by using the evaluation object seed, the evaluation term seed and the evaluation relationship seed after updating the parameter set of the DNN.

3. The method according to claim 2, wherein, after the training the DNN by using the evaluation object seed, the evaluation term seed and the evaluation relationship seed after updating the parameter set of the DNN, the method further comprises:
    at the first input layer of the DNN after updating the parameter set of the DNN, connecting, by the computing device, vectors corresponding to the candidate evaluation object, the candidate evaluation term and the candidate evaluation relationship to obtain a third input vector, at the first hidden layer of the DNN after updating the parameter set of the DNN, compressing, by the computing device, the third input vector to obtain a third middle vector, and at the first output layer of the DNN after updating the parameter set of the DNN, decoding the third middle vector to obtain a third output vector; and
    determining, by the computing device, whether a decoding error value of the third output vector is less than a decoding error value threshold, if yes, determining the candidate evaluation object, the candidate evaluation term and the candidate evaluation relationship corresponding to the third output vector as second opinion information.

4. The method according to claim 1, wherein, before determining whether the decoding error value of the first output vector is less than the decoding error value threshold, the method further comprises:
    determining, by the computing device, the decoding error value threshold according to the following dimensions:

target precision of opinion information extracted from an evaluation text, and target quantity of the opinion information extracted from the evaluation text, wherein the decoding error value threshold is negatively correlated with the target precision, and is positively correlated with the target quantity.

5. An information processing apparatus, comprising:
a processor for executing instructions stored in a non-transitory machine readable storage medium to:
train a Deep Neural Network (DNN) by using an evaluation object seed, an evaluation term seed and an evaluation relationship seed, the DNN comprising a first input layer, a first hidden layer and a first output layer, a number of nodes of the first input layer corresponding to that of the first output layer, and the number of nodes of the first input layer being greater than that of the first hidden layer;
at the first input layer, connect vectors corresponding to a candidate evaluation object, a candidate evaluation term and a candidate evaluation relationship to obtain a first input vector;
at the first hidden layer, compress the first input vector to obtain a first middle vector;
at the first output layer, decode the first middle vector to obtain a first output vector;
determine whether a decoding error value the first output vector is less than a decoding error value threshold, if yes, determine the candidate evaluation object, the candidate evaluation term and the candidate evaluation relationship corresponding to the first output vector as first opinion information;
wherein the instructions stored in the non-transitory machine readable storage medium further cause the processor to:
map the candidate evaluation object and the candidate evaluation term into corresponding vectors by using the DNN; and
at a second hidden layer to an nth hidden layer of the DNN, recursively map objects comprised in a syntactic dependency path of the candidate evaluation relationship into vectors,
wherein a Euclidean distance between any two vectors in the vectors obtained through mapping is positively correlated with a semantic or syntactic likelihood ratio test (LRT) index of the any two vectors, n is a positive integer, and n corresponds to the number of the objects comprised in the syntactic dependency path of the candidate evaluation relationship,
wherein the instructions stored in the non-transitory machine readable storage medium further cause the processor to:
at the first input layer, connect vectors corresponding to the evaluation object seed, the evaluation term seed and the evaluation relationship seed to obtain a second input vector;
at the first hidden layer, compress the second input vector to obtain a second middle vector;
at the first output layer, decode the second middle vector to obtain a second output vector; and
update a parameter set of the DNN until a Euclidean distance between the second output vector and the second input vector is minimum, and
wherein compressing of the first input vector and decoding the first middle vector are performed by implementing a recursive self-decoder which, each time the parameter set of the DNN is updated, recursively decode the first middle vector to obtain the first output vector.

6. The apparatus according to claim 5, wherein the instructions stored in the non-transitory machine readable storage medium further cause the processor to:
sort evaluation objects in the first opinion information according to the following dimensions in descending order: the number of times the evaluation objects in the first opinion information occur in an evaluation text; and the number of times the evaluation objects in the first opinion information are identified as evaluation object positive examples;
select M evaluation objects, in descending order, from the evaluation objects sorted in descending order, and determine the selected M evaluation objects as a subset of the evaluation object seed, M being an integer greater than 1; and
train the DNN by using the evaluation object seed, the evaluation term seed and the evaluation relationship seed after updating the parameter set of the DNN.

7. The apparatus according to claim 6, wherein the instructions stored in the non-transitory machine readable storage medium further cause the processor to:
at the first input layer of the DNN after updating the parameter set of the DNN, connect vectors corresponding to the candidate evaluation object, the candidate evaluation term and the candidate evaluation relationship to obtain a third input vector;
at the first hidden layer of the DNN after updating the parameter set of the DNN, compress the third input vector to obtain a third middle vector;
at the first output layer of the DNN after updating the parameter set of the DNN, decode the third middle vector to obtain a third output vector; and
determine whether a decoding error value of the third output vector is less than a decoding error value threshold, if yes, determine the candidate evaluation object, the candidate evaluation term and the candidate evaluation relationship corresponding to the third output vector as second opinion information.

8. The apparatus according to claim 5, wherein the instructions stored in the non-transitory machine readable storage medium further cause the processor to:
before determining whether the decoding error value of the first output vector is less than the decoding error value threshold, determine the decoding error value threshold according to the following dimensions:
target precision of opinion information extracted from an evaluation text; and target quantity of the opinion information extracted from the evaluation text,
wherein the decoding error value threshold is negatively correlated with the target precision, and is positively correlated with the target quantity.

9. An information processing method, the method comprising:
training, by a computing device, a Deep Neural Network (DNN) by using an evaluation object seed, an evaluation term seed and an evaluation relationship seed, the DNN comprising a first input layer, a first hidden layer and a first output layer, a number of nodes of the first input layer corresponding to that of the first output layer, and the number of nodes of the first input layer being greater than that of the first hidden layer;
at the first input layer, connecting, by the computing device, vectors corresponding to a candidate evaluation object, a candidate evaluation term and a candidate evaluation relationship to obtain a first input vector, at the first hidden layer, compressing, by the computing device, the first input vector to obtain a first middle vector, and at the first output layer, decoding the first middle vector to obtain a first output vector; and determining, by the computing device, whether a decoding error value of the first output vector is less than a decoding error value threshold, if yes, determining the candidate evaluation object, the candidate evaluation term and the candidate evaluation relationship corresponding to the first output vector as first opinion information;

wherein at the first input layer of the DNN, before connecting vectors corresponding to the candidate evaluation object, the candidate evaluation term and the candidate evaluation relationship to obtain the first input vector, the method further includes:
  extracting, by the computing device, nouns from an evaluation text;
  determining, by the computing device, a likelihood ratio test (LRT) index between an initial evaluation object seed and the nouns extracted from the evaluation text; and
  determining, by the computing device, nouns in the extracted nouns as a subset of the evaluation object seed, wherein the LRT index between the determined nouns and the initial evaluation object seed is greater than an LRT index threshold wherein the training the DNN by using the evaluation object seed, the evaluation term seed and the evaluation relationship seed comprises:
  at the first input layer, connecting, by the computing device, vectors corresponding to the evaluation object seed, the evaluation term seed and the evaluation relationship seed to obtain a second input vector;
  at the first hidden layer, compressing, by the computing device, the second input vector to obtain a second middle vector; and
  updating, by the computing device, a parameter set of the DNN until a Euclidean distance between a second output vector and the second input vector is minimum, the second output vector being a vector obtained by decoding the second middle vector at the first output layer, and wherein the compressing and the decoding, by the computing device, are performed by implementing a recursive self-decoder which, each time the parameter set of the DNN is updated, recursively decode the first middle vector to obtain the first output vector.

* * * * *